(12) United States Patent
Han

(10) Patent No.: US 9,736,364 B2
(45) Date of Patent: Aug. 15, 2017

(54) CAMERA CAPABLE OF REDUCING MOTION BLUR IN A LOW LUMINANCE ENVIRONMENT AND VEHICLE INCLUDING THE SAME

(71) Applicant: LG ELECTRONICS INC., Seoul (KR)

(72) Inventor: Jongwoo Han, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/671,170

(22) Filed: Mar. 27, 2015

(65) Prior Publication Data

US 2015/0350510 A1    Dec. 3, 2015

(30) Foreign Application Priority Data

May 29, 2014 (KR) ........................ 10-2014-0065435

(51) Int. Cl.
*H04N 5/232* (2006.01)
*H04N 5/235* (2006.01)
(Continued)

(52) U.S. Cl.
CPC ..... *H04N 5/23229* (2013.01); *G06K 9/00201* (2013.01); *G06K 9/00791* (2013.01); *H04N 5/2351* (2013.01); *H04N 5/2353* (2013.01); *H04N 5/2354* (2013.01); *H04N 5/2355* (2013.01); *H04N 7/18* (2013.01); *H04N 13/0239* (2013.01); *H04N 2013/0081* (2013.01); *H04N 2013/0092* (2013.01)

(58) Field of Classification Search
CPC ............... H04N 5/2353; H04N 5/2351; H04N 2013/0074; H04N 2013/0092
See application file for complete search history.

(56) References Cited

U.S. PATENT DOCUMENTS 6,122,597 A * 9/2000 Saneyoshi ............. G06T 7/0081
348/E13.014
2003/0086010 A1 * 5/2003 Luo ...................... H04N 5/2351
348/297

(Continued)

FOREIGN PATENT DOCUMENTS

CN     101119439     2/2008
EP     2 026 567 A1  2/2009

(Continued)

OTHER PUBLICATIONS

Korean Office Action dated Jun. 1, 2015 issued in Application No. 10-2014-0065435.

(Continued)

*Primary Examiner* — Paul Berardesca
(74) *Attorney, Agent, or Firm* — KED & Associates LLP

(57) ABSTRACT

A camera and a vehicle including the same are disclosed. The camera includes a first camera, an image sensor to sense an image based on light acquired by the first camera, and a processor to control the exposure time of the image sensed by the image sensor to be changed based on a brightness level and a brightness distribution value of the image acquired by the image sensor. Consequently, it is possible to reduce motion blur in a low luminance environment.

17 Claims, 24 Drawing Sheets

(51) Int. Cl.
*H04N 13/02* (2006.01)
*G06K 9/00* (2006.01)
*H04N 7/18* (2006.01)
*H04N 13/00* (2006.01)

(56) References Cited

U.S. PATENT DOCUMENTS

2009/0470100      2/2009   Yoshida et al.
2010/0303346 A1  12/2010   Suito
2012/0300094 A1  11/2012   Kaida
2013/0211675 A1   8/2013   Bonefas
2014/0309863 A1* 10/2014   Ricci .................. G01C 21/3484
                                                               701/36

FOREIGN PATENT DOCUMENTS

| JP | H06-11015 A | 4/1994 |
| JP | 11-258654 | 9/1999 |
| KR | 10-2004-0098716 A | 11/2004 |
| KR | 10-2006-0127522 A | 12/2006 |
| KR | 10-2008-0054881 A | 6/2008 |
| KR | 10-2011-0063819 A | 1/2013 |
| WO | WO 2014/070448 | 5/2014 |

OTHER PUBLICATIONS

European Office Action dated Aug. 4, 2015 issued in Application No. 15001623.6.
European Search Report dated Nov. 6, 2015.
Chinese Office Action dated Mar. 3, 2017 (English Translation).

\* cited by examiner (a)                    (a)

CAMERA CAPABLE OF REDUCING MOTION BLUR IN A LOW LUMINANCE ENVIRONMENT AND VEHICLE INCLUDING THE SAME

CROSS-REFERENCE TO RELATED APPLICATION

This application claims priority under 35 U.S.C. §119 to Korean Patent Application No. 10-2014-0065435, filed on May 29, 2014 whose disclosure is hereby incorporated by reference.

BACKGROUND OF THE INVENTION

1. Field

The present disclosure relates to a camera and a vehicle including the same and, more particularly, to a camera that is capable of reducing motion blur in a low luminance environment and a vehicle including the same.

2. Background

A vehicle is a device that allows a driver to move in a desired direction. A representative example of the vehicle may be a car.

In order to improve convenience of a user who uses the vehicle, the vehicle has been equipped with various sensors and electronic devices. In particular, various devices to improve driving convenience of the user have been developed.

During travel of the vehicle, it is typically necessary for a driver to safely control the vehicle in order to prevent an accident. However, it is very often difficult for the driver to safely control the vehicle under various travel conditions. Particularly, if the driver does not rapidly recognize an object ahead of the vehicle when the vehicle at high speed, a severe accident may be caused. On the other hand, it may be difficult for the driver to avoid an obstacle which abruptly appears even when the vehicle is travelling at low speed. Efforts have been made to solve the above problems and to manufacture safer vehicles. A representative example of the efforts is an obstacle detection method using an image from a camera.

SUMMARY OF THE INVENTION

It is an object of the present disclosure to provide a camera that is capable of reducing motion blur in a low luminance environment and a vehicle including the same.

In accordance with an aspect of the present disclosure, the above and other objects can be accomplished by the provision of a camera including a lens, an image sensor to sense an image based on light incident from the lens, and a processor to control exposure time of the image sensed by the image sensor to be changed based on a brightness level and a brightness distribution value of the image photographed by the image sensor.

In accordance with another aspect of the present disclosure, there is provided a vehicle including a steering drive unit to drive a steering apparatus, a brake drive unit to drive a brake apparatus, a power source drive unit to drive a power source, a controller to generate a control signal to control at least one of the steering drive unit, the brake drive unit, and the power source drive unit in the vehicle, and a camera equipped in the vehicle, wherein the camera includes a lens, an image sensor to sense an image based on light incident from the lens, and a processor to control exposure time of the image sensed by the image sensor to be changed based on a brightness level and a brightness distribution value of the image photographed by the image sensor.

BRIEF DESCRIPTION OF THE DRAWINGS

The embodiments will be described in detail with reference to the following drawings in which like reference numerals refer to like elements wherein.

DETAILED DESCRIPTION OF THE PREFERRED EMBODIMENTS

Exemplary embodiments of the present disclosure will be described with reference to the attached drawings.

The terms "module" and "unit," when attached to the names of components are used herein to help the understanding of the components and thus they should not be considered as having specific meanings or roles. Accordingly, the terms "module" and "unit" may be used interchangeably.

A vehicle as described in this specification may include a car and a motorcycle. Hereinafter, a description will be given based on a car.

On the other hand, a vehicle as described in this specification may include a vehicle having an engine, a hybrid vehicle having an engine and an electric motor, an electric vehicle having an electric motor, and the like. Hereinafter, a description will be given based on a vehicle having an engine.

Meanwhile, a driver assistance apparatus as described in this specification may be an advanced driver assistance system (ADAS) or an advanced driver assistance apparatus (ADAA). Hereinafter, a description will be given of various embodiments of a driver assistance apparatus according to the present disclosure and a vehicle including the same.

Figure 1:
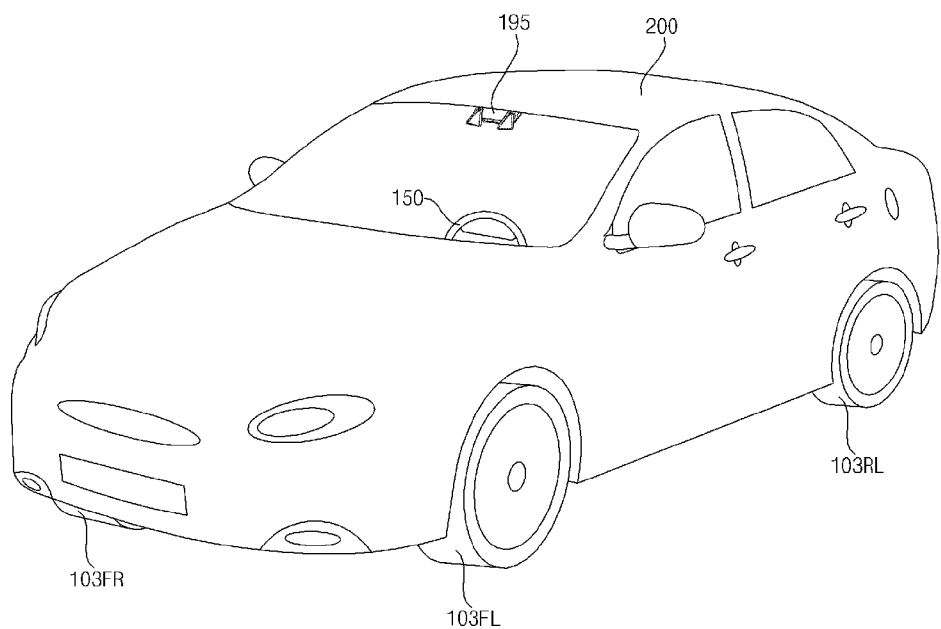
FIG. 1 is a view showing the external appearance of a vehicle having a stereo camera according to an embodiment of the present disclosure.

FIG. 1 is a view showing the external appearance of a vehicle having a stereo camera according to an embodiment of the present disclosure.

Referring to FIG. 1, a vehicle 200 may include a wheels 103FR, 103FL, 103RL, and the like, a steering wheel 150, and a stereo camera 195 provided in the vehicle 200.

The stereo camera 195 may include a plurality of cameras. Stereo images acquired by the cameras may be signal-processed in a driver assistance apparatus 100 (see FIG. 3).

By way of example, FIG. 1 shows that the stereo camera 195 includes two cameras.

Figure 2:
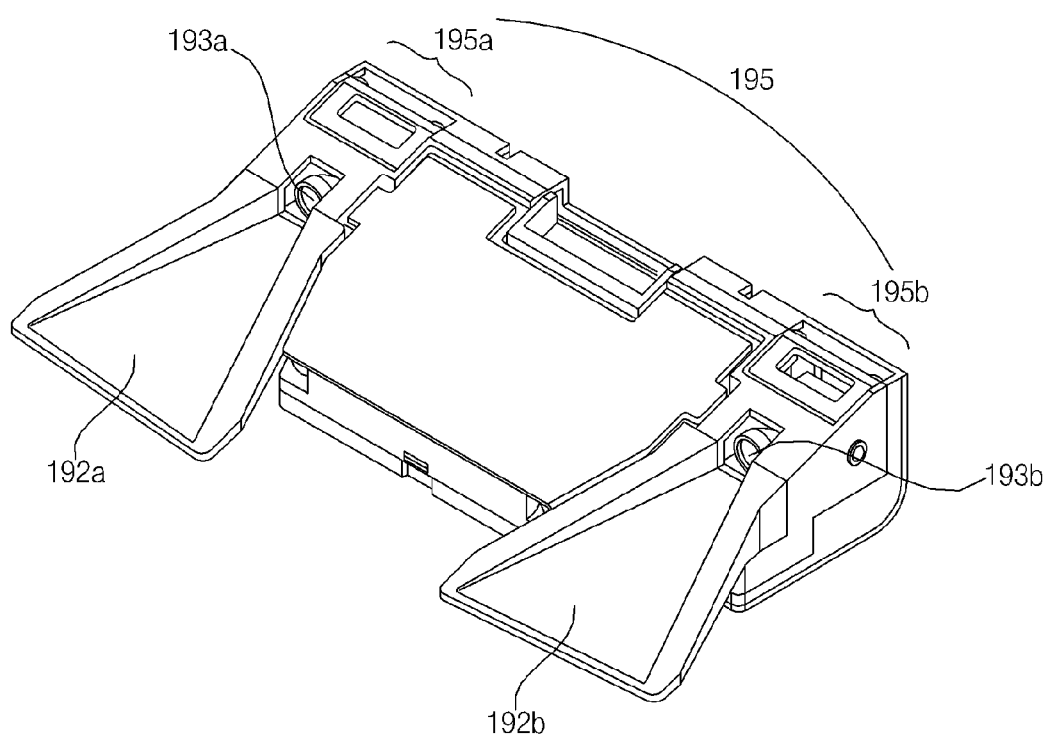
FIG. 2 is a view showing the external appearance of the stereo camera attached to the vehicle shown in FIG. 1.

FIG. 2 is a view showing the external appearance of the stereo camera attached to the vehicle shown in FIG. 1.

Referring to FIG. 2, the stereo camera 195 may include a first camera 195a having a first lens 193a and a second camera 195b having a second lens 193b.

In addition, the stereo camera 195 may further include a first light shield unit 192a to shield light falling incident upon the first lens 193a and a second light shield unit 192b to shield light falling incident upon the second lens 193b.

The stereo camera 195 shown in FIG. 2 may be detachably attached to a ceiling or a front windshield glass of the vehicle 200.

The driver assistance apparatus 100 (see FIG. 3) having the stereo camera 195 may acquire stereo images for a view forward or ahead of the vehicle from the stereo camera 195, detect a disparity based on the stereo images, detect an object for at least one of the stereo images based on disparity information, and continuously track motion of the object after detection of the object.

Figure 3A:
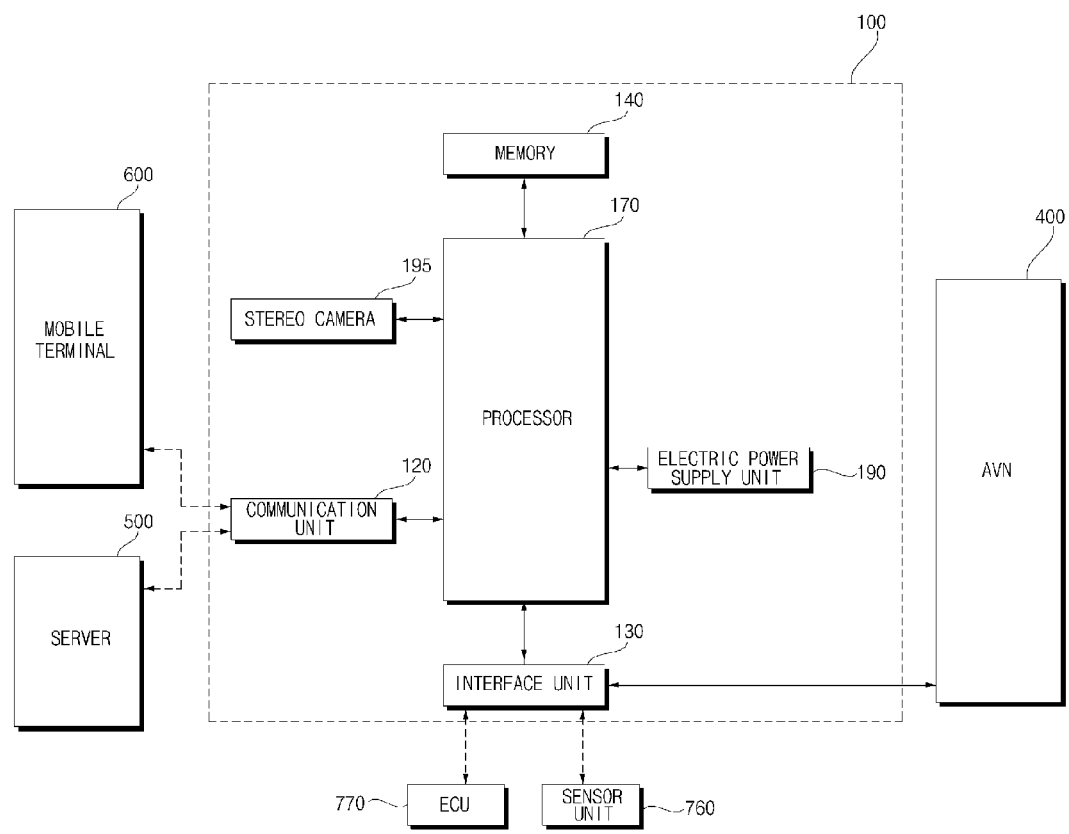
FIGS. 3A and 3B are internal block diagrams showing various examples of a driver assistance apparatus according to an embodiment of the present disclosure.
Figure 3B:
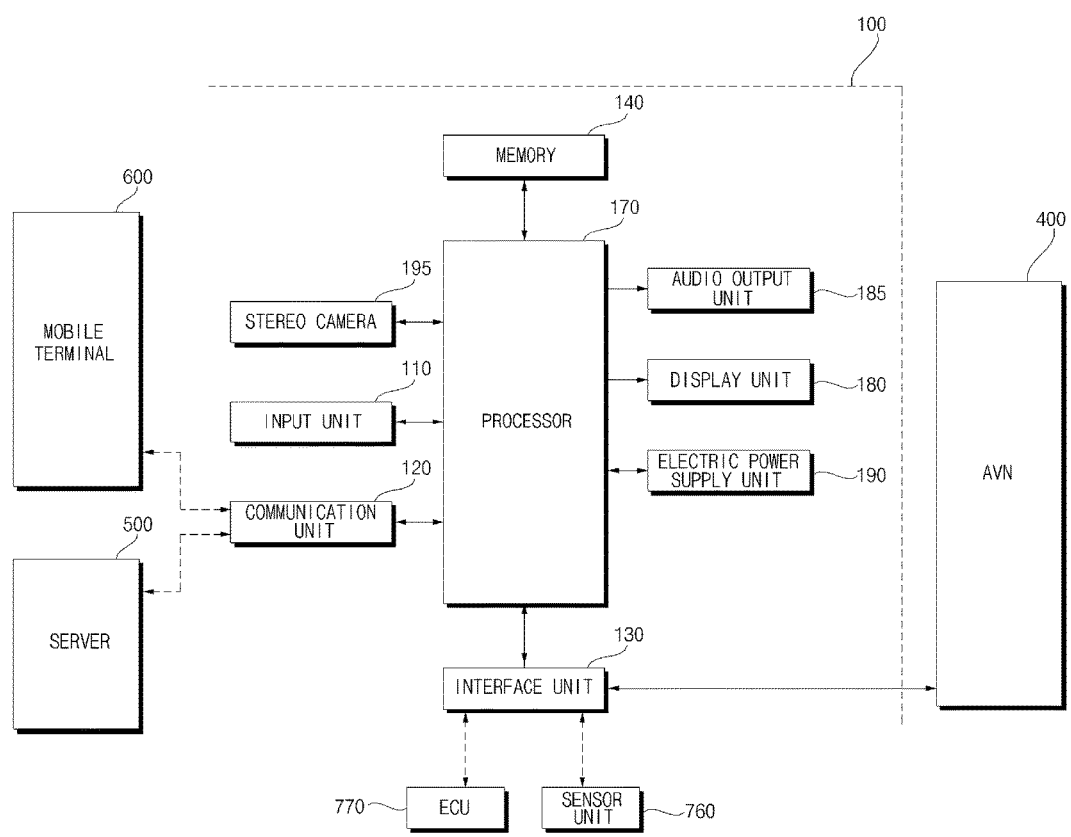

FIGS. 3A and 3B are internal block diagrams showing various examples of a driver assistance apparatus according to an embodiment of the present disclosure.

Referring to FIGS. 3A and 3B, a driver assistance apparatus 100 may signal-process stereo images received from the stereo camera 195 based on computer vision to generate vehicle-related information. Computer vision includes methods for acquiring, processing, analyzing, and understanding images and, in general, high-dimensional data from the real world in order to produce numerical or symbolic information, e.g., in the forms of decisions to duplicate the abilities of human vision by electronically perceiving and understanding an image. This image understanding can be seen as the disentangling of symbolic information from image data using models constructed with the aid of geometry, physics, statistics, and learning theory. The image data can take many forms, such as video sequences, views from multiple cameras, or multi-dimensional data. The vehicle-related information may include vehicle control information for direct control of the vehicle or driver assistance information for driving guidance provided to a driver.

Referring first to FIG. 3A, the driver assistance apparatus 100 may include a communication unit 120, an interface unit 130, a memory 140, a processor 170, an electric power supply unit 190, and a stereo camera 195.

The communication unit 120 may exchange data with a mobile terminal 600 or a server 500 in a wireless fashion. In particular, the communication unit 120 may exchange data with a mobile terminal of the driver in a wireless fashion. To this end, various wireless data communication protocols, such as Bluetooth, Wi-Fi, Wi-Fi Direct, and APiX, may be used.

The communication unit 120 may receive weather information and road traffic state information, such as Transport Protocol Expert Group (TPEG) information, from the mobile terminal 600 or the server 500. On the other hand, the communication unit 120 may transmit real-time traffic information acquired by the driver assistance apparatus 100 based on stereo images to the mobile terminal 600 or the server 500.

When a user gets into the vehicle, a mobile terminal 600 of the user may pair with the driver assistance apparatus 100 automatically or by the user executing a pairing application.

The interface unit 130 may receive vehicle-related data or transmit a signal processed or generated by the processor 170 to the outside. To this end, the interface unit 130 may perform data communication with an electronic control unit (ECU) 770, an audio and video navigation (AVN) apparatus 400, and a sensor unit 760 in the vehicle in a wired communication fashion or a wireless communication fashion.

The interface unit 130 may receive map information related to vehicle travel through data communication with the AVN apparatus 400.

On the other hand, the interface unit 130 may receive sensor information from the ECU 770 and the sensor unit 760.

The sensor information may include at least one of vehicle heading information, vehicle position information (GPS information), vehicle angle information, vehicle speed information, vehicle acceleration information, vehicle tilt information, vehicle forward movement/backward movement information, battery information, fuel information, tire information, vehicle lamp information, in-vehicle temperature information, or in-vehicle humidity information.

The sensor information may be acquired by a heading sensor, a yaw sensor, a gyro sensor, a position module, a vehicle forward movement/backward movement sensor, a wheel sensor, a vehicle speed sensor, a vehicle body tilt sensor, a battery sensor, a fuel sensor, a tire sensor, a steering sensor, an in-vehicle temperature sensor, or an in-vehicle humidity sensor. The position module may include a global positioning system (GPS) module to receive GPS information.

Of the above-specified sensor information, the vehicle heading information, the vehicle position information, the vehicle angle information, the vehicle speed information, and the vehicle tilt information, which are related to vehicle travel, may be referred to as vehicle travel information.

The memory 140 may store various data for overall operation of the driver assistance apparatus 100, such as programs for processing or control of the processor 170.

An audio interface unit (not shown) converts an electric signal received from the processor 170 into an audio signal and outputs the audio signal. To this end, the audio interface unit (not shown) may include a speaker. The audio interface unit (not shown) may output a sound corresponding to an operation of a user input unit (not shown), e.g. a button.

An audio input unit (not shown) may receive a user's voice. To this end, the audio input unit (not shown) may include a microphone. The received voice may be converted into an electric signal, which may be transmitted to the processor 170.

The processor 170 controls overall operation of each unit in the driver assistance apparatus 100.

In particular, the processor 170 performs signal processing based on computer vision. Consequently, the processor 170 may acquire stereo images for the view ahead of the vehicle from the stereo camera 195, calculate the disparity for the view ahead of the vehicle based on the stereo images, detect an object for at least one of the stereo images based on calculated disparity information, and continuously track motion of the object after detection of the object.

In particular, during detection of the object, the processor 170 may perform lane marker detection (LD), adjacent vehicle detection (VD), pedestrian detection (PD), bright spot detection (BD), traffic sign recognition (TSR), and road surface detection.

In addition, the processor 170 may calculate the distance to the detected adjacent vehicle, speed of the detected adjacent vehicle, and a difference in speed with the detected adjacent vehicle.

Meanwhile, the processor 170 may receive weather information and road traffic state information, such as TPEG information, through the communication unit 120.

On the other hand, the processor 170 may acquire, in real time, traffic-around-vehicle state information acquired by the driver assistance apparatus 100 based on stereo images.

Meanwhile, the processor 170 may receive map information from the AVN apparatus 400 through the interface unit 130.

On the other hand, the processor 170 may receive sensor information from the ECU 770 or the sensor unit 760 through the interface unit 130. The sensor information may include at least one of vehicle heading information, vehicle position information (GPS information), vehicle angle information, vehicle speed information, vehicle acceleration information, vehicle tilt information, vehicle forward movement/backward movement information, battery information, fuel information, tire information, vehicle lamp information, in-vehicle temperature information, and in-vehicle humidity information.

The electric power supply unit 190 may supply electric power to the respective components under control of the processor 170. In particular, electric power from an in-vehicle battery may be supplied to the electric power supply unit 190.

The stereo camera 195 may include a plurality of cameras. In the following description, it is assumed that the stereo camera 195 includes two cameras as previously described with reference to FIG. 2.

The stereo camera 195 may be detachably attached to a ceiling or a front windshield glass of the vehicle 200. The stereo camera 195 may include a first camera 195*a* having a first lens 193*a* and a second camera 195*b* having a second lens 193*b*.

In addition, the stereo camera 195 may further include a first light shield unit 192*a* to shield light incident upon the first lens 193*a* and a second light shield unit 192*b* to shield light incident upon the second lens 193*b*.

Referring now to FIG. 3B, the driver assistance apparatus 100 of FIG. 3B may further include an input unit 110, a display unit 180, and an audio output unit 185 as compared with the driver assistance apparatus 100 of FIG. 3A. Hereinafter, a description will be given of only the input unit 110, the display unit 180, and the audio output unit 185.

The user input unit 110 may include a plurality of buttons or a touchscreen attached to the driver assistance apparatus 100, specifically to the stereo camera 195. The driver assistance apparatus 100 may be powered on through the buttons or the touchscreen such that the driver assistance apparatus 100 is operated. In addition, various input operations may be performed through the input unit 110.

The audio output unit 185 outputs a sound based on an audio signal processed by the processor 170 to the outside. To this end, the audio output unit 185 may include at least one speaker.

The display unit 180 may display an image related to an operation of the driver assistance apparatus. In order to display such an image, the display unit 180 may include a cluster or a head up display (HUD) provided at the inside front of the vehicle. In a case in which the display unit 180 is the HUD, the display unit 180 may include a projection module to project an image on the front windshield glass of the vehicle 200.

Figure 4A:
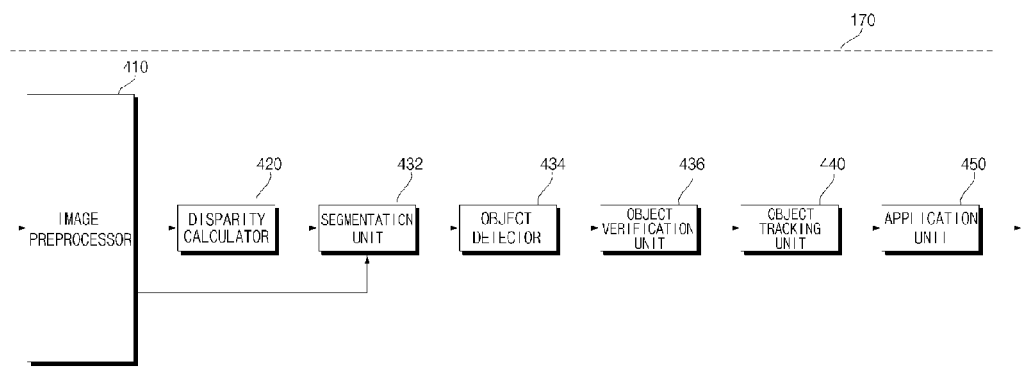
FIGS. 4A and 4B are internal block diagrams showing various examples of a processor shown in FIGS. 3A and 3B.
Figure 4B:
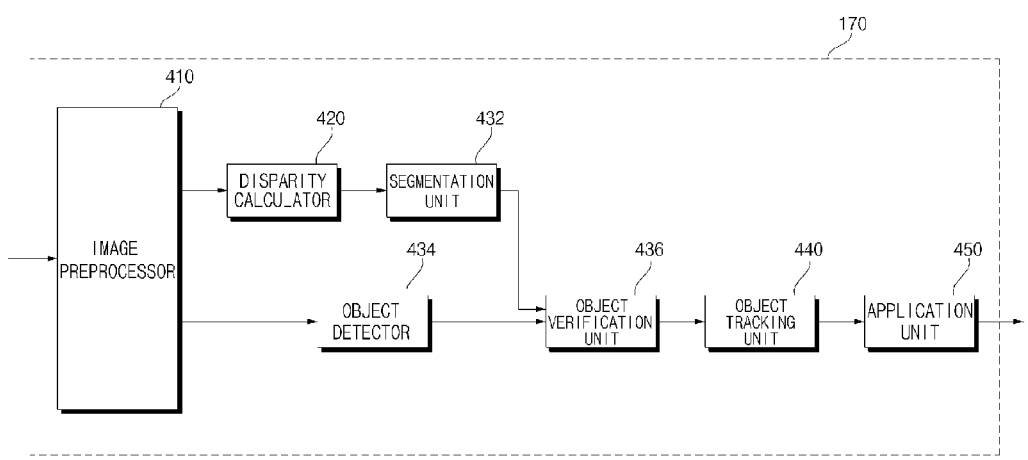

FIGS. 4A and 4B are internal block diagrams showing various examples of the processor shown in FIGS. 3A and 3B and FIGS. 5A and 5B are reference views illustrating operations of the processors shown in FIGS. 4A and 4B.

Referring first to FIG. 4A, which is an internal block diagram showing an example of the processor 170, the processor 170 of the driver assistance apparatus 100 may include an image preprocessor 410, a disparity calculator 420, a segmentation unit 432, an object detector 434, an object verification unit 436, an object tracking unit 440, and an application unit 450.

The image preprocessor 410 receives stereo images from the stereo camera 195 and preprocesses the received stereo images.

Specifically, the image preprocessor 410 may perform noise reduction, rectification, calibration, color enhancement, color space conversion (CSC), interpolation, and camera gain control for the stereo images. As a result, the image preprocessor 410 may acquire stereo images more vivid than the stereo images photographed by the stereo camera 195.

The disparity calculator 420 may receive the stereo images signal-processed by the image preprocessor 410, perform stereo matching for the received stereo image, and acquire a disparity map based on the stereo matching. That is, the disparity calculator 420 may acquire disparity information of stereo images for a view ahead of the vehicle.

The stereo matching may be performed on a per pixel basis or a per predetermined block basis of the stereo images. Meanwhile, the disparity information may be included in a map showing binocular parallax information as values.

The segmentation unit 432 may perform segmentation and clustering for at least one of the stereo images based on the disparity information from the disparity calculator 420.

Specifically, the segmentation unit 432 may segment at least one of the stereo images into a background and a foreground based on the disparity information.

For example, a region having a predetermined value or less of the disparity information in the disparity map may be calculated as a background and the region may be excluded. As a result, a foreground may be relatively separated from the stereo image.

In another example, a region having a predetermined value or more of the disparity information in the disparity map may be calculated as a foreground and the region may be extracted. As a result, the foreground may be separated from the stereo image.

As described above, the stereo image is segmented into the background and the foreground based on the disparity information extracted based on the stereo image. Therefore, signal processing speed and signal processing amount may be reduced during detection of an object.

The object detector 434 may detect an object based on the image segment from the segmentation unit 432. That is, the object detector 434 may detect an object for at least one of the stereo images based on the disparity information. For example, the object detector 434 may detect an object from a foreground separated from the stereo image by the image segment. Subsequently, the object verification unit 436 classifies and verifies the separated object.

To this end, the object verification unit 436 may use a recognition method using a neural network, a support vector machine (SVM) method, a recognition method based on AdaBoost using a Haar-like feature, or a histograms of oriented gradients (HOG) method or another appropriate technique.

On the other hand, the object verification unit 436 may compare the detected object with objects stored in the memory 140 to verify the detected object.

For example, the object verification unit 436 may verify an adjacent vehicle, a lane marker, a road surface, a traffic sign, a dangerous zone, a tunnel, and the like located around the vehicle.

The object tracking unit 440 tracks the verified object. For example, the object tracking unit 440 may verify an object in stereo images which are sequentially acquired, calculate motion or a motion vector of the verified object, and track movement of the object based on the calculated motion or the calculated motion vector. Consequently, the object tracking unit 440 may track an adjacent vehicle, a lane marker, a road surface, a traffic sign, a dangerous zone, a tunnel, and the like located around the vehicle.

Subsequently, the application unit 450 may calculate a risk of the vehicle 200 based on various objects, such as adjacent vehicle, a lane marker, a road surface, and a traffic sign, located around the vehicle. In addition, the application unit 450 may calculate a possibility of a rear-end collision with a preceding vehicle, slip of the vehicle, and the like.

In addition, the application unit 450 may output a message informing a user of the following information as driver assistance information based on the calculated risk, the calculated possibility of the rear-end collision, or the calculated slip of the vehicle. Alternatively, the application unit 450 may generate a control signal for attitude control or travel control of the vehicle 200 as vehicle control information.

FIG. 4B is an internal block diagram showing another example of the processor 170. Referring to FIG. 4B, the processor 170 of FIG. 4B is substantially similar in construction to the processor 170 of FIG. 4A except that a signal processing sequence of the processor 170 of FIG. 4B is different from that of the processor 170 of FIG. 4A. Hereinafter, a description will be given for only the difference between the processor 170 of FIG. 4B and the processor 170 of FIG. 4A.

The object detector 434 may receive stereo images and detect an object for at least one of the stereo images. Unlike FIG. 4A, the object detector 434 may not detect an object for an image segmented based on disparity information but directly detect an object from a stereo image.

Subsequently, the object verification unit 436 may classify and verify the detected and separated object based on the image segment from the segmentation unit 432 and the object detected by the object detector 434.

To this end, the object verification unit 436 may use a recognition method using a neural network, an SVM method, a recognition method based on AdaBoost using a Haar-like feature, or a HOG method.

Figure 5A:
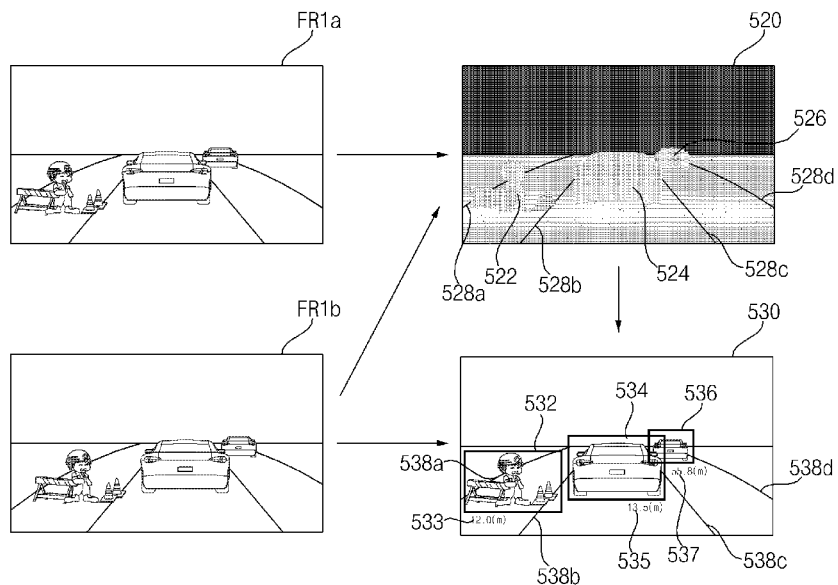
FIGS. 5A and 5B are reference views illustrating operations of the processors shown in FIGS. 4A and 4B.
Figure 5B:
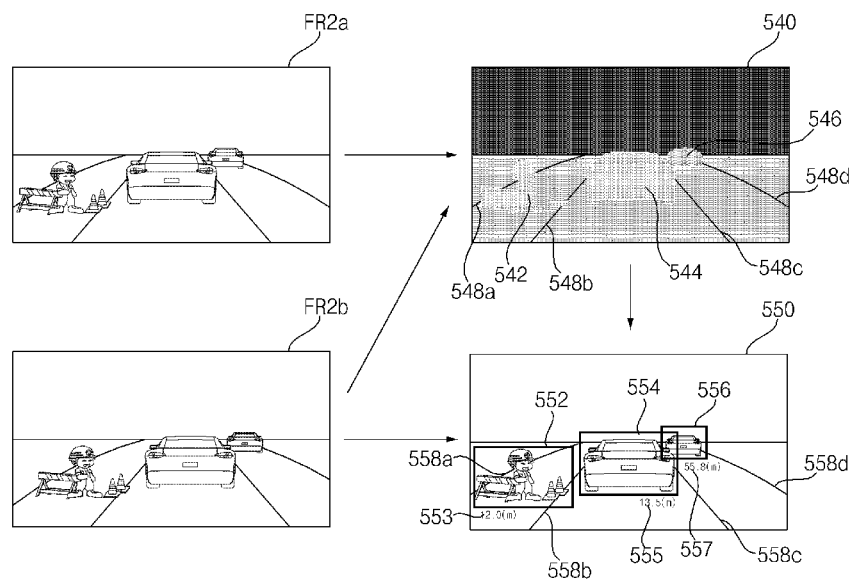

FIGS. 5A and 5B are reference views illustrating an operation of the processor 170 shown in FIG. 4A based on stereo images acquired from first and second frame periods.

Referring first to FIG. 5A, the stereo camera 195 acquires stereo images during the first frame period.

The disparity calculator 420 of the processor 170 receives stereo images FR1*a* and FR1*b* signal-processed by the image preprocessor 410 and performs stereo matching for the received stereo images FR1*a* and FR1*b* to acquire a disparity map 520.

The disparity map 520 shows a disparity between the stereo images FR1*a* and FR1*b* as levels. When a disparity level is high, the distance to the vehicle may be calculated as being short. When a disparity level is low, on the other hand, the distance to the vehicle may be calculated as being long.

Meanwhile, in a case in which the disparity map is displayed, the disparity map may be displayed with higher brightness when the disparity level is higher and the disparity map may be displayed with lower brightness when the disparity level is lower.

By way of example, FIG. 5A shows that, in the disparity map 520, first to fourth lane markers 528*a*, 528*b*, 528*c*, and 528*d* have their own disparity levels and a construction zone 522, a first preceding vehicle 524, and a second preceding vehicle 526 have their own disparity levels.

The segmentation unit 432, the object detector 434, and the object verification unit 436 respectively perform segmentation, object detection, and object verification for at least one of the stereo images FR1*a* and FR1*b* based on the disparity map 520.

FIG. 5A shows, by way of example, that object detection and object verification for the second stereo image FR1*b* are performed using the disparity map 520.

That is, object detection and object verification for first to fourth lane markers 538*a*, 538*b*, 538*c*, and 538*d*, a construction zone 532, a first preceding vehicle 534, and a second preceding vehicle 536 in an image 530 may be performed.

Referring now to FIG. 5B, the stereo camera 195 acquires stereo images during the second frame period. The disparity calculator 420 of the processor 170 receives stereo images FR2*a* and FR2*b* signal-processed by the image preprocessor 410 and performs stereo matching for the received stereo images FR2*a* and FR2*b* to acquire a disparity map 540.

In the disparity map 540, first to fourth lane markers 548*a*, 548*b*, 548*c*, and 548*d* have their own disparity levels and a construction zone 542, a first preceding vehicle 544, and a second preceding vehicle 546 have their own disparity levels.

The segmentation unit 432, the object detector 434, and the object verification unit 436 respectively perform segmentation, object detection, and object verification for at least one of the stereo images FR2*a* and FR2*b* based on the disparity map 540. The object detection and object verification for the second stereo image FR2*b* are performed using the disparity map 540. That is, object detection and object verification for first to fourth lane markers 558*a*, 558*b*, 558*c*, and 558*d*, a construction zone 552, a first preceding vehicle 554, and a second preceding vehicle 556 in an image 550 may be performed.

Meanwhile, the object tracking unit 440 may track the objects verified based on comparison between FIGS. 5A and 5B.

Specifically, the object tracking unit 440 may track movement of the objects verified in FIGS. 5A and 5B based on motion or motion vectors of the objects. Consequently, the object tracking unit 440 may track the lane markers, the construction zone, the first preceding vehicle, and the second preceding vehicle located around the vehicle.

Figure 6A:
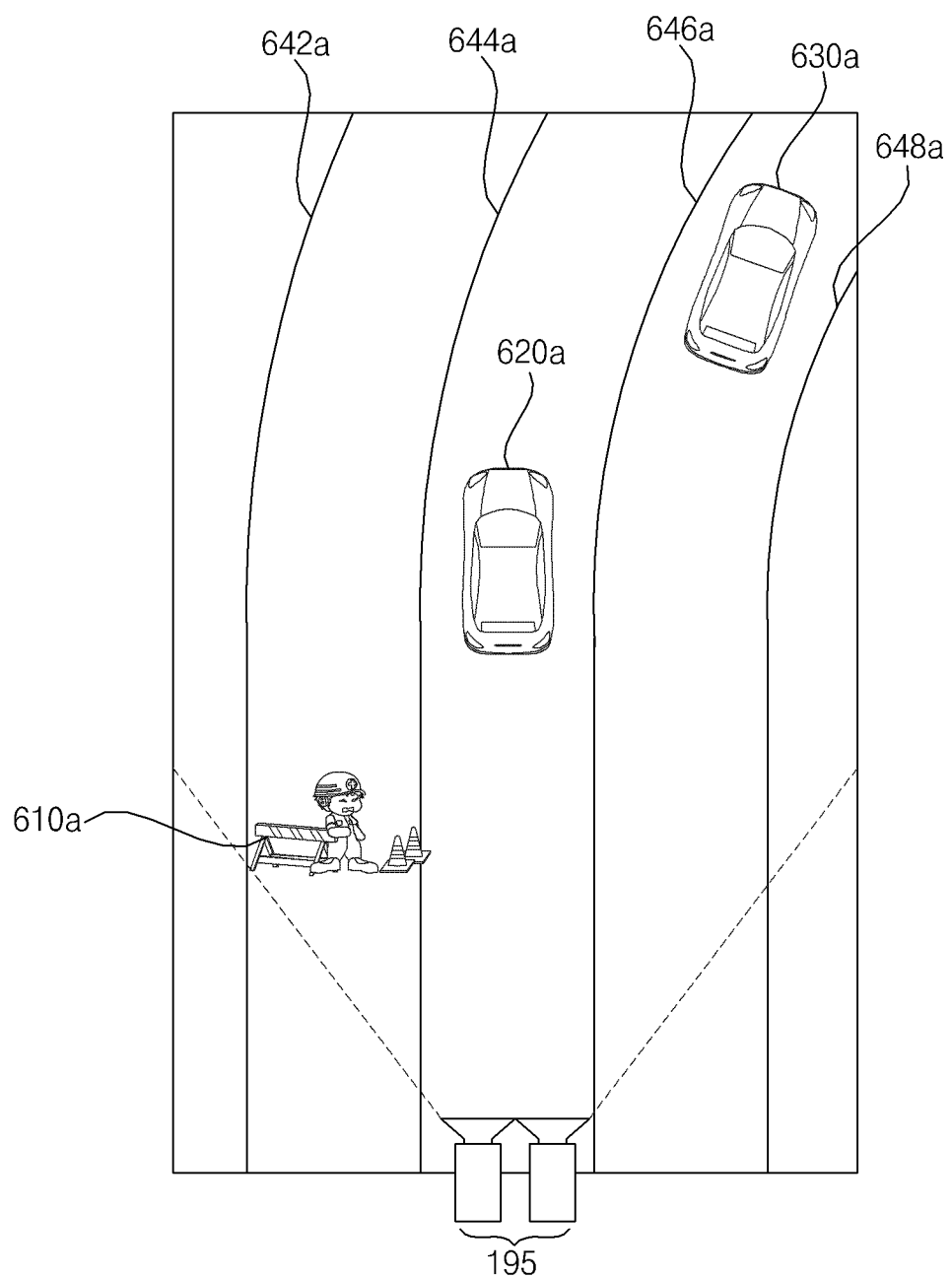
FIGS. 6A and 6B are reference views illustrating operations of the driver assistance apparatuses shown in FIGS. 3A and 3B.
Figure 6B:
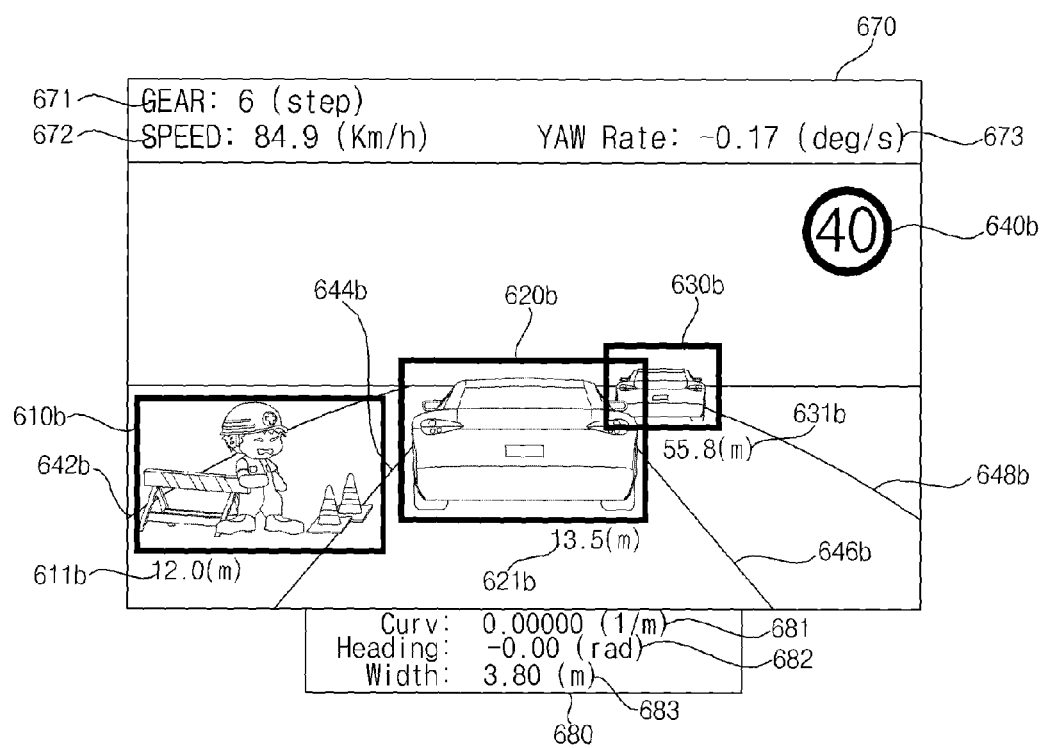

FIGS. 6A and 6B are reference views illustrating an operation of the driver assistance apparatus shown in FIG. 3.

By way of example, FIG. 6A shows a state ahead of the vehicle photographed by the stereo camera 195 provided in the vehicle. In particular, the state ahead of the vehicle may be displayed as a bird eye view. A first lane marker 642*a*, a second lane marker 644*a*, a third lane marker 646*a*, and a fourth lane marker 648*a* are arranged from the left side to the right side. A construction zone 610*a* is located between the first lane marker 642*a* and the second lane marker 644*a*. A first preceding vehicle 620*a* is located between the second lane marker 644a and the third lane marker 646a. A second preceding vehicle 630a is located between the third lane marker 646a and the fourth lane marker 648a.

By way of example, FIG. 6B shows a state ahead of the vehicle acquired by the driver assistance apparatus together with various kinds of information. In particular, an image as shown in FIG. 6B may be displayed on the display unit 180 of the driver assistance apparatus or on the AVN apparatus 400. The information is displayed based on images photographed by the stereo camera 195 unlike FIG. 6A. A first lane marker 642b, a second lane marker 644b, a third lane marker 646b, and a fourth lane marker 648b are arranged from the left side to the right side. A construction zone 610b is located between the first lane marker 642b and the second lane marker 644b. A first preceding vehicle 620b is located between the second lane marker 644b and the third lane marker 646b. A second preceding vehicle 630b is located between the third lane marker 646b and the fourth lane marker 648b.

The driver assistance apparatus 100 may perform signal processing based on stereo images photographed by the stereo camera 195 to verify objects for the construction zone 610b, the first preceding vehicle 620b, and the second preceding vehicle 630b. In addition, the driver assistance apparatus 100 may verify the first lane marker 642b, the second lane marker 644b, the third lane marker 646b, and the fourth lane marker 648b.

Meanwhile, FIG. 6B shows, by way of example, that, in order to indicate that the objects for the construction zone 610b, the first preceding vehicle 620b, and the second preceding vehicle 630b have been verified, borders of the objects are highlighted.

On the other hand, the driver assistance apparatus 100 may calculate distance information for the construction zone 610b, the first preceding vehicle 620b, and the second preceding vehicle 630b based at least in part on stereo images photographed by the stereo camera 195.

The calculated first distance information 611b, calculated second distance information 621b, and calculated third distance information 631b respectively corresponding to the construction zone 610b, the first preceding vehicle 620b, and the second preceding vehicle 630b may be displayed.

Meanwhile, the driver assistance apparatus 100 may receive sensor information for the vehicle from the ECU 770 or the sensor unit 760. In particular, the driver assistance apparatus 100 may receive and display vehicle speed information, gear information, yaw rate information indicating speed at which a rotational angle (yaw angle) of the vehicle is changed, and vehicle angle information.

FIG. 6B shows that vehicle speed information 672, gear information 671, and yaw rate information 673 may be displayed at a portion 670 above the image ahead of the vehicle and vehicle angle information 682 is displayed at a portion 680 under the image ahead of the vehicle. However, various examples may be further provided and fall within the scope of the present disclosure. In addition, vehicle width information 683 and road curvature information 681 may be displayed together with the vehicle angle information 682.

On the other hand, the driver assistance apparatus 100 may receive for a road on which the vehicle is traveling through the communication unit 120 or the interface unit 130. The speed limit information 640b may also be displayed.

The driver assistance apparatus 100 may display various kinds of information shown in FIG. 6B through the display unit 180. Alternatively, the driver assistance apparatus 100 may store various kinds of information without additionally displaying the information. In addition, the driver assistance apparatus 100 may utilize the information in various applications.

Figure 7:
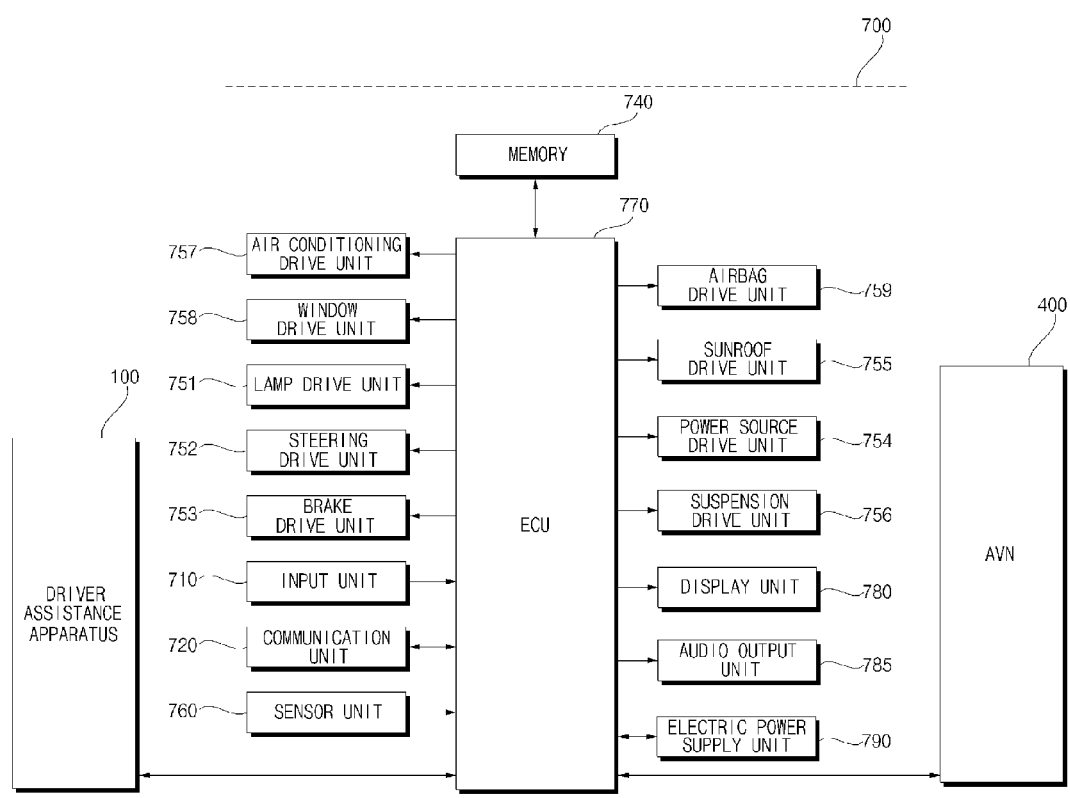
FIG. 7 is an internal block diagram showing an example of an electronic control apparatus in the vehicle shown in FIG. 1.

FIG. 7 is an internal block diagram showing an example of an electronic control apparatus in the vehicle shown in FIG. 1.

Referring to FIG. 7, the vehicle 200 may include an electronic control apparatus 700 for vehicle control. The electronic control apparatus 700 may exchange data with the driver assistance apparatus 100 and the AVN apparatus 400.

The electronic control apparatus 700 may include a user input unit 710, a communication unit 720, a memory 740, a lamp drive unit 751, a steering drive unit 752, a brake drive unit 753, a power source drive unit 754, a sunroof drive unit 755, a suspension drive unit 756, an air conditioning drive unit 757, a window drive unit 758, an airbag drive unit 759, a sensor unit 760, an ECU 770, a display unit 780, an audio output unit 785, and an electric power supply unit 790.

The user input unit 710 may include a plurality of buttons or a touchscreen provided in the vehicle 200. Various input operations may be performed through the buttons or the touchscreen.

In one example, the communication unit 720 may exchange data with the mobile terminal 600 or the server 500 in a wireless fashion. In particular, the communication unit 720 may exchange data with a mobile terminal of the driver in a wireless fashion. To this end, various wireless data communication protocols, such as Bluetooth, Wi-Fi, Wi-Fi Direct, and APiX, may be used.

The communication unit 720 may receive weather information and road traffic state information, such as TPEG information, from the mobile terminal 600 or the server 500.

When a user gets into the vehicle, a mobile terminal 600 of the user may pair with the electronic control apparatus 700 automatically or by the user executing an application.

The memory 740 may store various data for overall operation of the electronic control apparatus 700, such as programs for processing or control of the ECU 770.

The lamp drive unit 751 may control turn on/turn off of lamps provided inside and outside the vehicle. In addition, the lamp drive unit 751 may control intensity, direction, and the like of light emitted from each lamp. For example, the lamp drive unit 751 may control a direction indicating lamp, a brake lamp, and the like.

The steering drive unit 752 may electronically control a steering apparatus in the vehicle 200. Consequently, the steering drive unit 752 may change a heading of the vehicle.

The brake drive unit 753 may electronically control a brake apparatus in the vehicle 200. For example, the brake drive unit 753 may control an operation of a brake mounted at each wheel to reduce speed of the vehicle 200. In another example, the brake drive unit 753 may differently control operations of brakes mounted at left wheels and right wheels to adjust the heading of the vehicle 200 to the left or the right.

The power source drive unit 754 may electronically control a power source in the vehicle 200. For example, in a case in which the power source is an engine using fossil fuel, the power source drive unit 754 may electronically control the engine. Consequently, the power source drive unit 754 may control output torque of the engine.

In another example, in a case in which the power source is an electric motor, the power source drive unit 754 may control the motor. Consequently, the power source drive unit 754 may control rotational speed and torque of the motor.

The sunroof drive unit 755 may electronically control a sunroof apparatus in the vehicle 200. For example, the sunroof drive unit 755 may control a sunroof to be opened or closed.

The suspension drive unit 756 may electronically control a suspension apparatus in the vehicle 200. For example, in a case in which a road surface is uneven, the suspension drive unit 756 may control the suspension apparatus to reduce vibration of the vehicle 200.

The air conditioning drive unit 757 may electronically control an air conditioner in the vehicle 200. For example, in a case in which the internal temperature of the vehicle is high, the air conditioning drive unit 757 may control the air conditioner to supply cool air into the vehicle.

The window drive unit 758 may electronically control a window apparatus (not shown) in the vehicle 200. For example, the window drive unit 758 may control left and right side windows of the vehicle to be opened or closed.

The airbag drive unit 759 may electronically control an airbag apparatus in the vehicle 200. For example, the airbag drive unit 759 may control an airbag to deploy in a dangerous situation.

The sensor unit 760 senses a signal related to travel of the vehicle 200. To this end, the sensor unit 760 may include a heading sensor, a yaw sensor, a gyro sensor, a position module, a vehicle forward movement/backward movement sensor, a wheel sensor, a vehicle speed sensor, a vehicle body tilt sensor, a battery sensor, a fuel sensor, a tire sensor, a steering sensor, an in-vehicle temperature sensor, and an in-vehicle humidity sensor, or another appropriate type of sensor.

Consequently, the sensor unit 760 may acquire a sensing signal for vehicle heading information, vehicle position information (GPS information), vehicle angle information, vehicle speed information, vehicle acceleration information, vehicle tilt information, vehicle forward movement/backward movement information, battery information, fuel information, tire information, vehicle lamp information, in-vehicle temperature information, in-vehicle humidity information, and the like.

In addition, the sensor unit 760 may further include an engine speed sensor, an air flow sensor (AFS), an intake air temperature sensor (ATS), a water temperature sensor (WTS), a throttle position sensor (TPS), a top dead center (TDC) sensor, and a crank angle sensor (CAS).

The ECU 770 may control overall operation of each unit in the electronic control apparatus 700.

The ECU 770 may perform a specific operation based on an input through the input unit 710, receive and transmit a signal sensed by the sensor unit 760 to the driver assistance apparatus 100, receive map information from the AVN apparatus 400, or control operations of the respective drive units 751, 752, 753, 754, and 756. In addition, the ECU 770 may receive weather information and road traffic state information, such as TPEG information, from the communication unit 720.

The display unit 780 may display an image related to an operation of the driver assistance apparatus. In order to display such an image, the display unit 780 may include a cluster or an HUD provided at the inside front of the vehicle. In a case in which the display unit 180 is the HUD, the display unit 180 may include a projection module to project an image on the front windshield glass of the vehicle 200. Meanwhile, the display unit 780 may include a touchscreen to allow input by tapping on the screen.

The audio output unit 785 converts an electric signal received from the ECU 770 into an audio signal and outputs the audio signal. To this end, the audio output unit 785 may include a speaker. The audio output unit 785 may output a sound corresponding to an operation of the input unit 710, e.g., a button.

The electric power supply unit 790 may supply electric power to the respective components under control of the ECU 770. In particular, electric power from an in-vehicle battery may be supplied to the electric power supply unit 790.

Hereinafter, the internal structure of the stereo camera 195 to photograph an image ahead of the vehicle as previously described with reference to FIG. 2 will be described in detail with reference to FIGS. 8A and 8B.

Figure 8A:
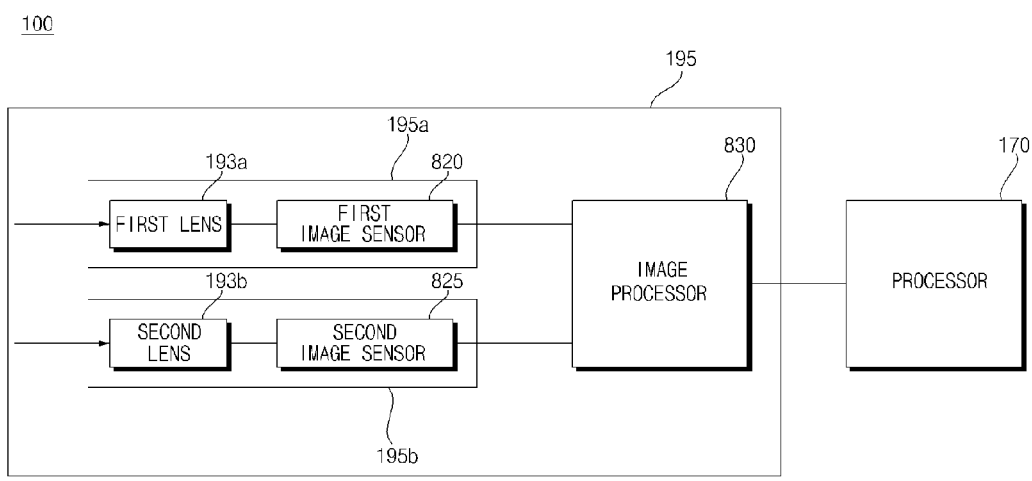
FIGS. 8A and 8B are internal block diagrams showing various examples of the stereo camera shown in FIG. 2.

Referring first to FIG. 8A, the stereo camera 195 may include a first camera 195a, a second camera 195b, and an image processor 830.

Meanwhile, the driver assistance apparatus 100 (see FIG. 3) may include a processor 170 in addition to the image processor 830 as shown in FIG. 8A.

The first camera 195a may include a first lens 193a and a first image sensor 820. The second camera 195b may include a second lens 193b and a second image sensor 825.

The first lens 193a and the second lens 193b may be spaced apart from each other by a distance of about 200 mm to 400 mm.

In accordance with the embodiment of the present disclosure, the first image sensor 820 may sense an image corresponding to at least one exposure time and the second image sensor 825 may sense images corresponding to a plurality of exposure times.

Meanwhile, the image processor 830 may generate a disparity map and an RGB image based on the images acquired by the first and second image sensors 820 and 825. The generated RGB image may be an RGB image based on a high dynamic range (HDR) image.

Particularly, in accordance with the embodiment of the present disclosure, the exposure time of the image acquired by the first image sensor 820 may be different from the exposure times of the images acquired by the second image sensor 825.

The image processor 830 may generate a disparity map and an RGB image based on images, corresponding to different exposure times, from the first and second image sensors 820 and 825.

Specifically, in connection with acquisition of an RGB image, the image processor 830 may generate an RGB image based on the images, corresponding to different exposure times, from the first and second image sensors 820 and 825. In addition, in connection with acquisition of a disparity map, the image processor 830 may signal-process the images corresponding to different exposure times such that the images have the same exposure time and generate a disparity map based on the images having the same exposure time.

Consequently, the image processor 830 may acquire a disparity map and an RGB image with reduced sensitivity loss and artifacts.

As an example of signal processing performed such that the images have the same exposure time, on the other hand, the image processor 830 may generate a first combined image from the image acquired by the first image sensor 820 and may generate a second combined image from the images acquired by the second image sensor 825. Subsequently, the image processor 830 may generate a disparity map based on the first and second combined images.

Meanwhile, the exposure times of the first and second image sensors 820 and 825 may be adjusted based on an electric signal.

For example, during a first frame period, the first image sensor 820 may output a first image having an exposure time corresponding to the first frame period. During the first frame period, on the other hand, the second image sensor 825 may output a second image having an exposure time corresponding to a portion of the first frame period and a third image having an exposure time corresponding to another portion of the first frame period.

In particular, the second image sensor 825 may output a second image and a third image having different exposure times according to an ON or OFF state of an electric signal.

On the other hand, the image processor 830 may set the exposure times of the first and second image sensors 820 and 825 and may control the first and second image sensors 820 and 825 to be operated based on the set exposure times.

Meanwhile, in order to adjust the exposure times of the first and second image sensors 820 and 825, the stereo camera 195 may further include a first aperture 194*a* (see FIG. 9A) to adjust the amount of light incident upon the first lens 193*a* and a second aperture 194*b* (see FIG. 9A) to adjust the amount of light falling incident upon the second lens 193*b*. Consequently, the stereo camera 195 may acquire images having different exposure times according to an opening and closing of the first and second aperture 194*a* and 194*b* (see FIG. 9A).

On the other hand, the image processor 830 may control the exposure times of images acquired by the first and second image sensors 820 and 825 during a first frame and the exposure times of images acquired by the first and second image sensors 820 and 825 during a second frame to be different from one another. That is, the image processor 830 may control the exposure times of the first and second image sensors 820 and 825 to be changed on a per frame basis.

For example, the image processor 830 may acquire an RGB image based on images, having different exposure times, acquired by the first and second image sensors 820 and 825 and generate a disparity map based on images, having the same exposure time, acquired by the first and second image sensors 820 and 825 during a second frame.

On the other hand, the image processor 830 may control the exposure time of at least one of the first and second image sensors 820 and 825 to be increased when the vehicle goes into a tunnel and may control the exposure time of at least one of the first and second image sensors 820 and 825 to be decreased when the vehicle comes out of the tunnel.

Meanwhile, the processor 170 of the driver assistance apparatus 100 (see FIG. 3) may receive a disparity map and an RGB image generated by the image processor 830 of the stereo camera 195 and may perform signal processing based thereupon.

For example, the processor 170 may detect an object for an RGB image ahead of the vehicle based on the disparity map and the RGB image and continuously track motion of the object after detection of the object. In addition, the processor 170 may calculate the distance to an adjacent vehicle, speed of the detected adjacent vehicle, and a difference in speed with the detected adjacent vehicle.

Alternatively, the processor 170 may generate and output a control signal for attitude control or travel control of the vehicle 200 based on the calculated speed of the adjacent vehicle and the calculated distance to the adjacent vehicle. For example, the processor 170 may generate a control signal to control at least one of the steering drive unit 752, the brake drive unit 753, the power source drive unit 754, and the suspension drive unit 756 in the vehicle.

Alternatively, the image processor 830 may further detect an object for an RGB image ahead of the vehicle based on the disparity map and the RGB image in addition to generation of the disparity map and the RGB image and continuously track motion of the object after detection of the object. In addition, the image processor 830 may calculate the distance to an adjacent vehicle, the speed of the detected adjacent vehicle, and a difference in the speed with the detected adjacent vehicle.

At this time, the processor 170 may receive information regarding the distance to the adjacent vehicle, information regarding the speed of the detected adjacent vehicle, and information regarding the difference in speed with the detected adjacent vehicle from the image processor 830 and may generate a control signal to control at least one of the steering drive unit 752, the brake drive unit 753, the power source drive unit 754, and the suspension drive unit 756 in the vehicle based thereupon.

Alternatively, the image processor 830 may generate a disparity map and an RGB image, detect an object, track the motion of the object, calculate the distance to an adjacent vehicle, the speed of the detected adjacent vehicle, and a difference in speed with the detected adjacent vehicle, and generate a control signal to control at least one of the steering drive unit 752, the brake drive unit 753, the power source drive unit 754, and the suspension drive unit 756 in the vehicle.

Figure 8B:
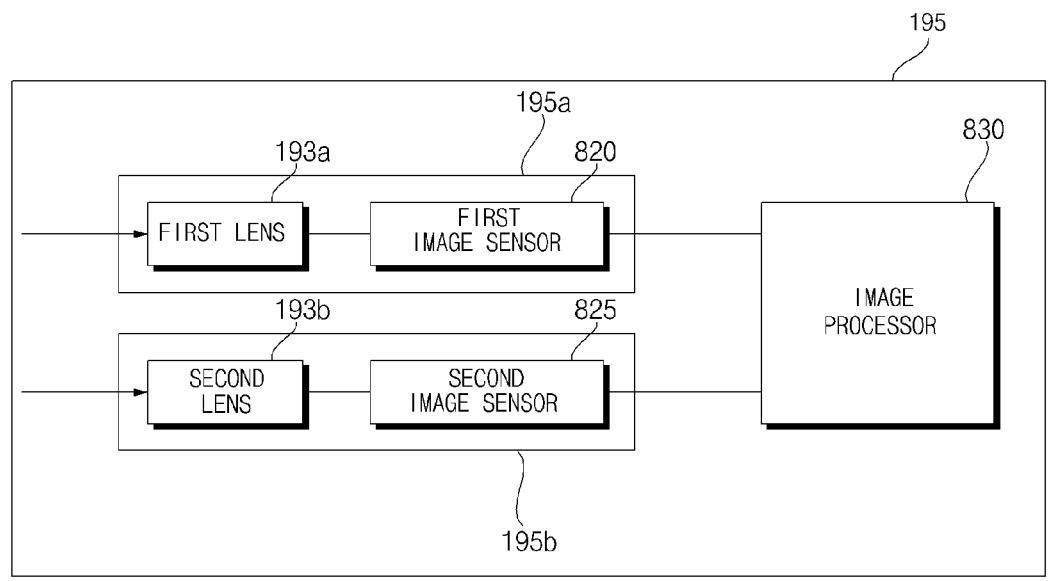

That is, as shown in FIG. 8B, the stereo camera 195 may include a first camera 195*a*, a second camera 195*b*, and an image processor 830. At this time, the driver assistance apparatus 100 (see FIG. 3) may not include a processor 170 as shown in FIG. 8A. That is, the image processor 830 of the stereo camera 195 may perform all functions of the processor 170.

In this case, the stereo camera 195 of FIG. 8B may be identical to the driver assistance apparatus 100 (see FIG. 3) as described above.

FIGS. 9A to 9D are reference views illustrating an operation of the stereo camera shown in FIG. 8A or 8B.

Figure 9A:
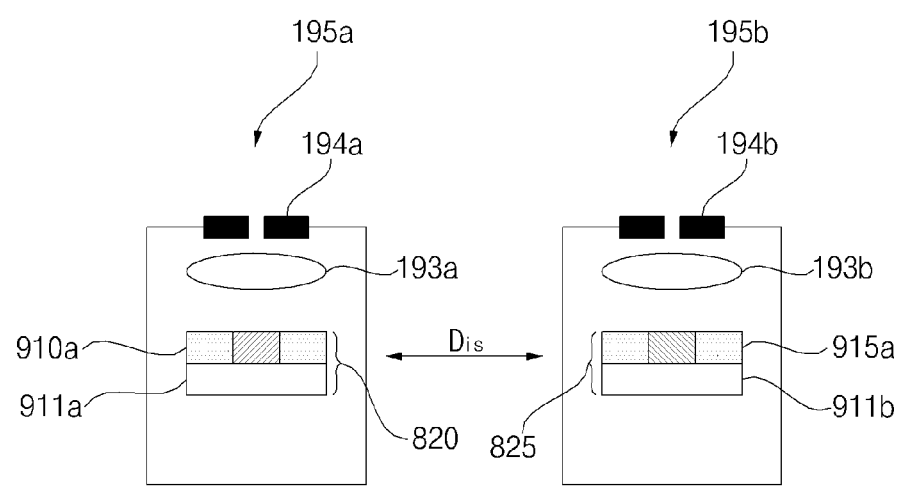
FIGS. 9A to 9D are reference views illustrating an operation of the stereo camera shown in FIG. 8A or 8B.

FIG. 9A shows an example of a first camera 195*a* and a second camera 195*b* in a stereo camera 900*a*. The first camera 195*a* may include a first aperture 194*a*, a first lens 193*a*, and a first image sensor 820*a*. The second camera 195*b* may include a second aperture 194*b*, a second lens 193*b*, and a second image sensor 825*a*. The first aperture 194*a* may adjust the amount of light incident upon the first lens 193*a*. The second aperture 194*b* may adjust the amount of light incident upon the second lens 193*b*. In order to sense RGB colors, the first image sensor 820*a* may include an RGB filter 910*a* and a sensor array 911*a* to convert an optical signal into an electric signal. To sense RGB colors, the second image sensor 825*a* may include an RGB filter 915*a* and a sensor array 911*b* to convert an optical signal into an electric signal. In this way, the first image sensor 820*a* and the second image sensor 825*a* may sense and output RGB images.

Figure 9B:
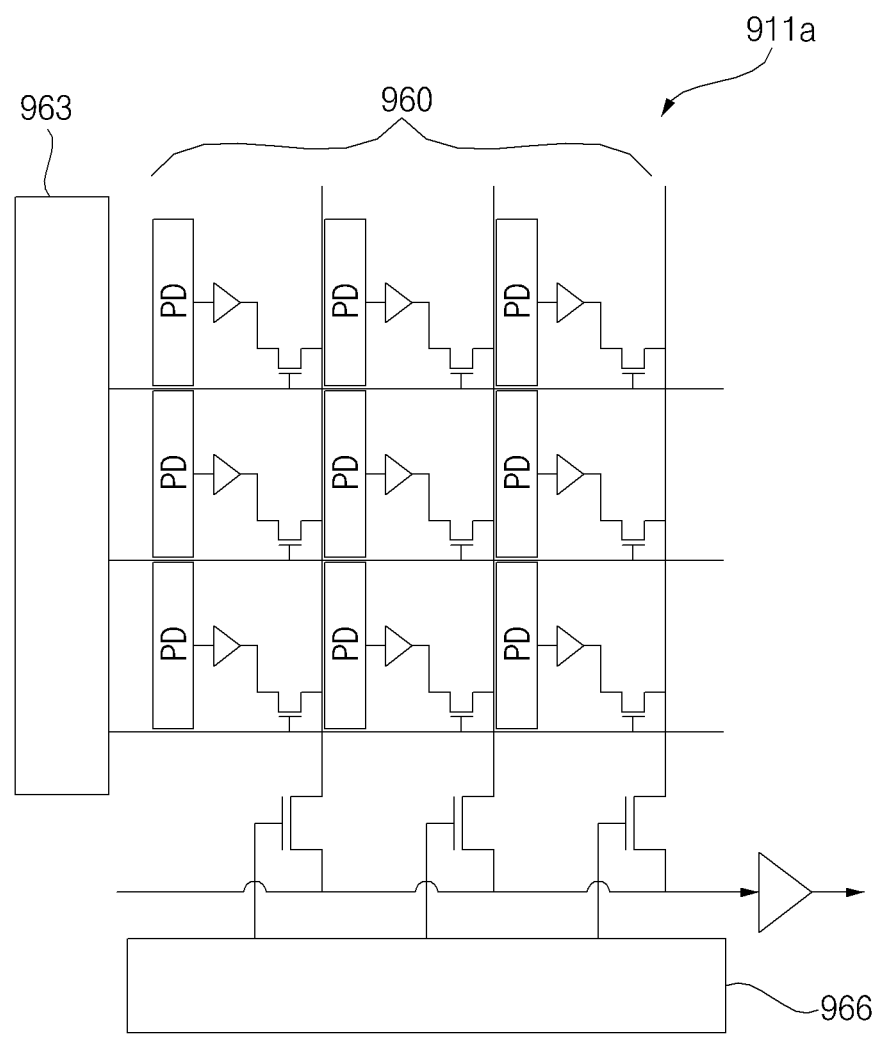

FIG. 9B is a schematic circuit diagram of the first sensor array 911*a* shown in FIG. 9A.

Referring to FIG. 9B, the first sensor array 911*a* may include a pixel circuit unit 960, a row decoder 963, and a column decoder 966.

Each pixel in the pixel circuit unit 960 may include a photodiode to detect light and circuit elements to transmit the signal detected by the photodiode to rows and columns.

An electric signal sensed by each pixel may be output to the outside through the row decoder 963 and the column decoder 966.

Figure 9C:
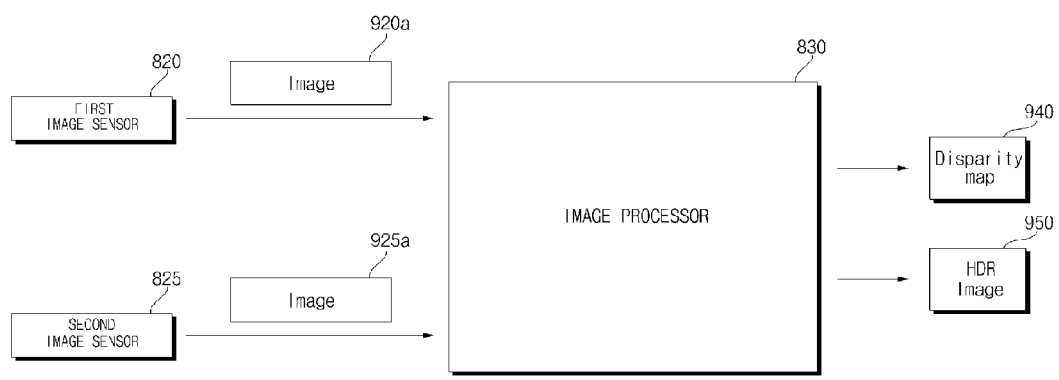

FIG. 9C is a reference view illustrating an operation of the image processor 830 based on a first image 920a and a second image 925a respectively sensed by the first image sensor 820a and the second image sensor 825a.

The first image 920a sensed by the first image sensor 820a may be an image based on RGB colors and the second image 925a sensed by the second image sensor 825a may be an image based on RGB colors.

Meanwhile, in accordance with the embodiment of the present disclosure, the first image sensor 820 may sense an image corresponding to at least one exposure time. The second image sensor 825 may sense images corresponding to a plurality of exposure times.

The image processor 830 may generate a disparity map 940 and an RGB image 950 based on the images acquired by the first and second image sensors 820 and 825. The generated RGB image 950 may be an RGB image based on a high dynamic range (HDR) image. The exposure time of the image acquired by the first image sensor 820 may be different from the exposure times of the images acquired by the second image sensor 825.

The image processor 830 may generate a disparity map 940 and an RGB image 950 based on the images, corresponding to different exposure times, from the first and second image sensors 820 and 825, as described in detail below. Consequently, the image processor 830 may acquire a disparity map 940 and an RGB image 950 with reduced sensitivity loss and artifacts.

Figure 9D:
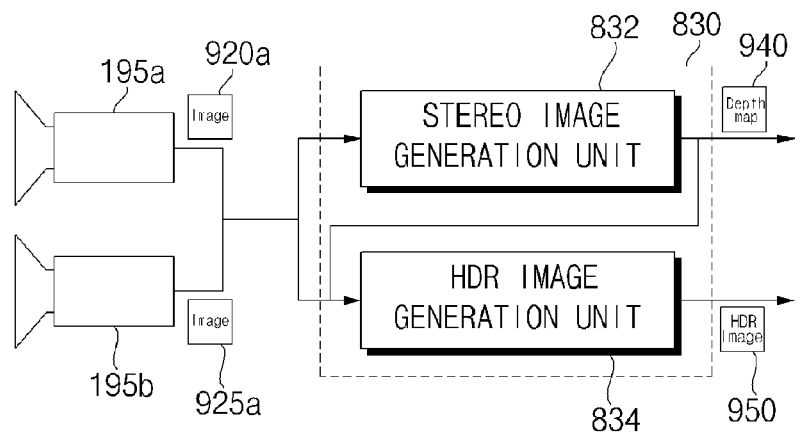

FIG. 9D is an internal block diagram showing an example of the image processor.

The image processor 830 may further include a stereo image generation unit 832 to generate a disparity map 940 and an HDR image generation unit 834 to generate an RGB image 950.

Specifically, the stereo image generation unit 832 may acquire disparity between the images 920a and 925a from the first and second image sensors 820 and 825 and generate a disparity map based on the disparity. In particular, the stereo image generation unit 832 may acquire the disparity in brightness between the images 920a and 925a and generate a disparity map based on the disparity in brightness.

In particular, the stereo image generation unit 832 may signal-process images having different exposure times such that the images have the same exposure time and generate a disparity map based on the image having the same exposure time.

That is, the stereo image generation unit 832 may generate a first combined image from the image acquired by the first image sensor 820 and may generate a second combined image from the images acquired by the second image sensor 825. In addition, the stereo image generation unit 832 may generate a disparity map based on the generated first and second combined images. The first combined image and the second combined image may be images corresponding to the same first frame period.

The HDR image generation unit 834 may generate an RGB image based on images having different exposure times. Specifically, the HDR image generation unit 834 may extract partial regions from images corresponding to the respective exposure times and combine the extracted partial regions to generate a new RGB image. In particular, the HDR image generation unit 834 may extract brightness regions to the respective exposure times and combine the extracted brightness regions to generate a new RGB image. Consequently, the HDR image generation unit 834 may generate an RGB image based on an HDR image. That is, the HDR image generation unit 834 may acquire an HDR image having adjustable contrast and dynamic range.

On the other hand, the cameras 195a and 195b equipped in the vehicle may generally photograph images having a higher dynamic range than a general camera. In a case in which auto exposure time of the images is decided only using a brightness component, therefore, motion blur may occur in a low luminance environment.

An embodiment of the present disclosure is a method of reducing motion blur in a low luminance environment, which will hereinafter be described in detail with reference to FIGS. 10A to 13B.

All details of FIGS. 10A to 13B may be applied to the stereo cameras 195a and 195b. Hereinafter, a description will be given focusing on an image acquired by any one of the stereo cameras 195a and 195b for the sake of convenience.

Figure 10A:
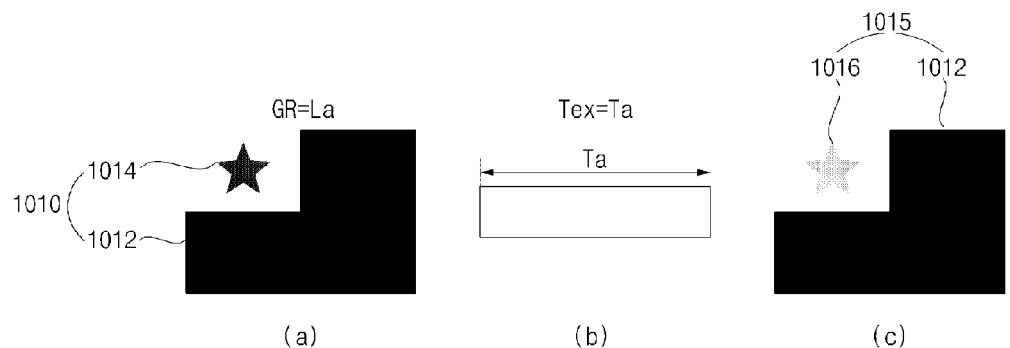
FIGS. 10A to 13B are reference views illustrating an operation of a camera according to an embodiment of the present disclosure.

FIG. 10A(a) shows an example of a real image 1010. The image 1010 may be divided into a first region 1012 having low luminance and a second region 1014 having a higher luminance than the first region 1012. In a case in which the size of the first region 1012 is substantially greater than that of the second region 1014, brightness of the image 1010 is affected by a brightness component of the first region 1012. As a result, the image 1010 has low luminance brightness. In FIG. 10A(a), the image 1010 has a brightness GR of La.

In a case in which the image sensor 820a of the first camera 195a has an exposure time Tex of Ta based on a brightness component thereof as shown in FIG. 10A(b), motion blur may occur in an image 1015 acquired by the image sensor 820a of the first camera 195a as shown in FIG. 10A(c). Specifically, a first region 1012 of the image 1015 is vivid, i.e., clear and detailed, due to the exposure time Tex of Ta set based on the brightness GR of La but blur occurs in a second region 1016 of the image 1015.

In order to solve the above problem, an embodiment of the present disclosure is a method of changing exposure time of an image sensed by the image sensor based on a brightness level in the image photographed by the image sensor and a brightness distribution value, thereby reducing motion blur in a low luminance environment.

In particular, the processor 830 controls the exposure time of an image sensed by the image sensor 820a to be changed based on a brightness level in the image photographed by the image sensor 820a and a brightness distribution value.

Figure 10B:
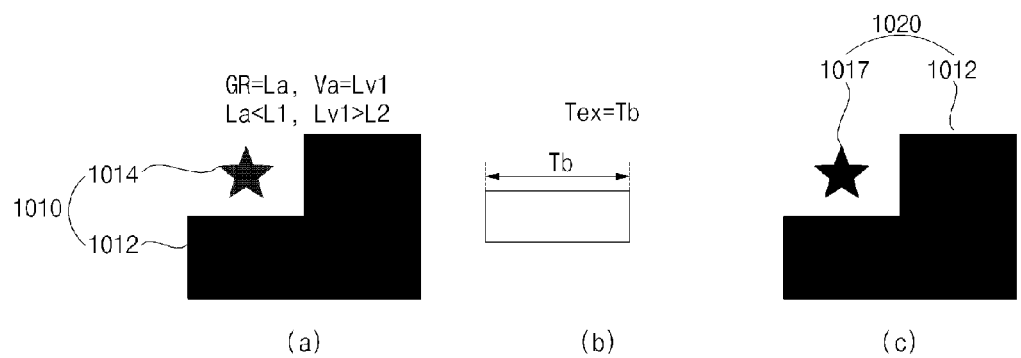

FIG. 10B(a) shows an example of an actual image 1010 identical to that shown in FIG. 10A(a).

The processor 830 may calculate an average brightness level in the image photographed by the image sensor 820a and a brightness distribution value based on the image photographed by the image sensor 820a. Subsequently, the processor 830 may control exposure time of an image sensed by the image sensor 820a to be changed based on the calculated average brightness level and the calculated brightness distribution value.

The real image 1010 of FIG. 10B(a) has an average brightness GR of La, which is less than a first level L1, but has a brightness distribution value Va of Lv1, which is greater than a second level L2. Consequently, the processor 830 may set exposure time Tb such that the exposure time Tb is less than the exposure time of Ta in FIG. 10A(b).

As the exposure time is more shortened, motion blur in an image 1020 acquired through adjustment of the exposure time may be considerably reduced as shown in FIG. 10B(c).

In FIG. 10B(c), not only a first region 1012 of the image 1020 but also a second region 1017 of the image 1020 is vivid.

Even in a case in which the average brightness has low luminance brightness as described above, it is possible to reduce motion blur by adjusting the exposure time further using the brightness distribution value. This method uses the brightness distribution value without detecting another region having a different brightness level in the photographed image, thereby considerably reducing the amount of data calculation.

Alternately, the processor 830 may adjust the gain per frequency during image signal processing using the average brightness level and the brightness distribution value in addition to the exposure time of the image. As a result, it is possible to acquire a more vivid image. This method may be applied to an image having a high dynamic range in addition to an image having low luminance.

Alternately, in a case in which the brightness distribution value Lv1 is equal to or greater than the second level L2 in a state in which the brightness level La of the photographed image is equal to or less than the first level L1, the processor 830 may control the exposure time to be shorter than in a case in which the brightness distribution value Lv1 is less than the second level L2 in a state in which the brightness level La of the photographed image is equal to or less than the first level L1.

Figure 10C:
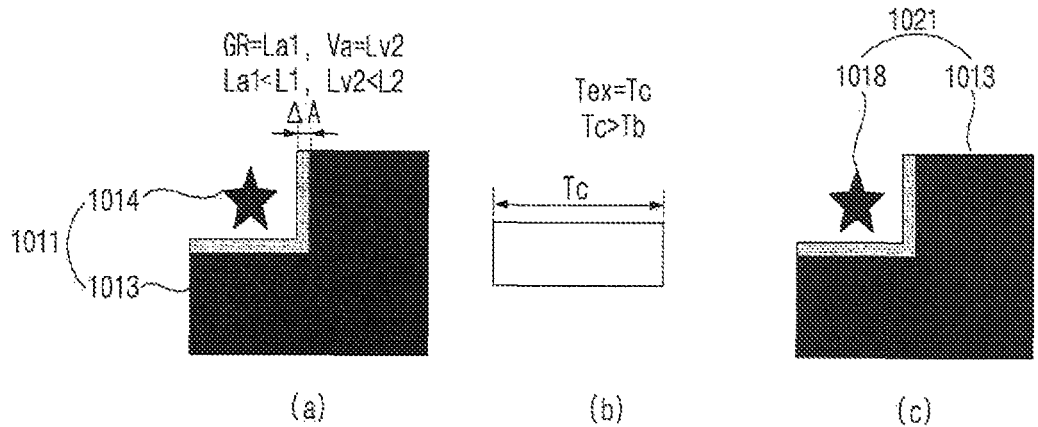

FIG. 10C(a) shows an example of an actual image 1011 having a higher average brightness level and a lower brightness distribution value than the real image 1010 shown in FIG. 10B(a). In particular, FIG. 10C(a) shows, by way of example, that the image 1011 has an average brightness level La1, which is less than the first level L1, and a brightness distribution value Lv2, which is less than the second level L2.

Referring to FIG. 10C(a), the image 1011 includes a first region 1013 and a second region 1014. In particular, the size of the first region 1013 is greater by ΔA than a first region 1012 of the image 1010 shown in FIG. 10B(a).

In a case in which the average brightness level is low luminance, but the brightness distribution value is relatively small, the processor 830 may increase the exposure time of the image.

That is, as shown in FIG. 10C(b), the processor 830 may set exposure time Tc such that the exposure time Tc is greater than the exposure time Tb in FIG. 10B(b). In this case, however, the exposure time Tc may be less than the exposure time Ta in FIG. 10A(b).

As shown in FIG. 10C(c), therefore, motion blur in an image 1021 acquired through adjustment of the exposure time may be considerably reduced. In FIG. 10C(c), not only a first region 1013 of the image 1021 but also a second region 1018 of the image 1021 is vivid.

As can be seen from comparison between FIGS. 10B and 100, the processor may set the exposure time Tb such that the exposure time Tb is less than the exposure time Tc in FIG. 10C(b) in a case in which the brightness distribution value is larger in a low luminance state.

The processor 830 controls the exposure time to decrease as the brightness level becomes higher in a state in which the brightness level is greater than the first level L1.

Alternately, in the case in which the brightness distribution value is equal to or greater than the second level L2 in a state in which the brightness level is greater than the first level L1, the processor controls the exposure time to be longer than in a case in which the brightness distribution value is less than the second level L2 in a state in which the brightness level is greater than the first level L1.

Figure 10D:
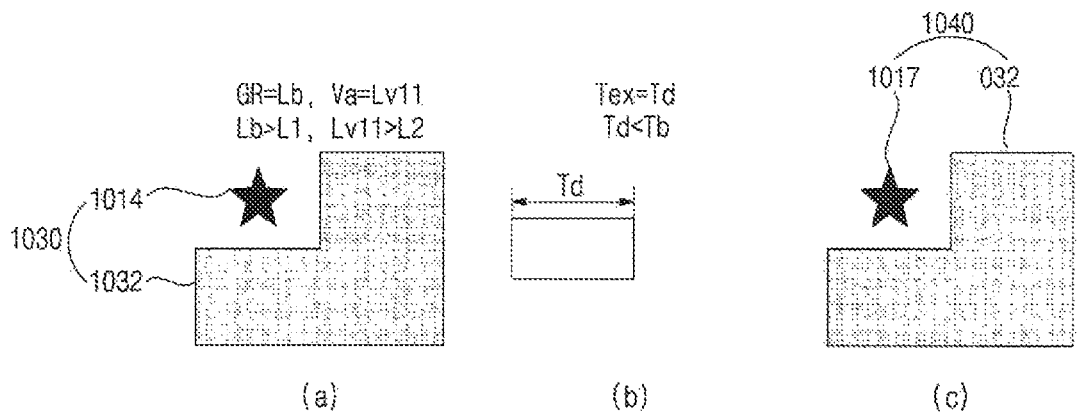
Figure 10E:
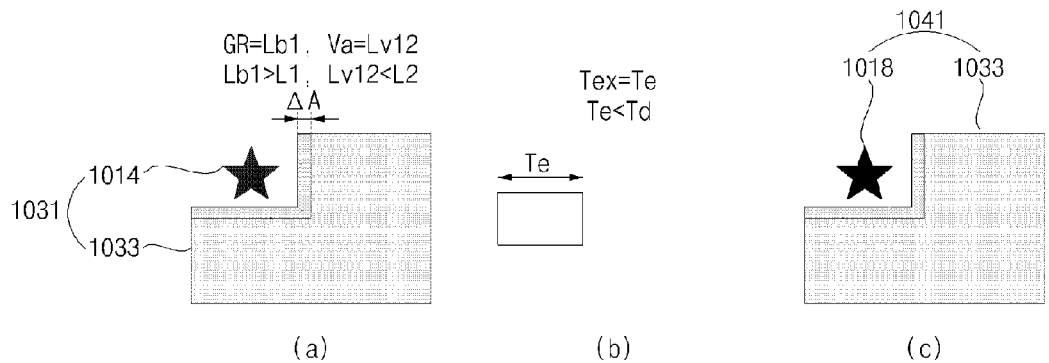

FIGS. 10D and 10E show, by way of example, average brightness levels greater than those of FIGS. 10B and 100.

An actual image 1030 of FIG. 10D(a) has an average brightness GR of Lb, which is greater than the first level L1, and has a brightness distribution value Va of Lv11, which is greater than the second level L2. Consequently, the processor 830 may set exposure time Td such that the exposure time Td is less than the exposure time of Tb in FIG. 10B(b).

As the exposure time is decreased, an image 1040 acquired through adjustment of the exposure time may be vivid as shown in FIG. 10D(c). In FIG. 10D(c), not only a first region 1032 of the image 1040 but also a second region 1017 of the image 1040 is vivid.

Even in a case in which the average brightness has a high luminance brightness, as described above, it is possible to acquire a vivid image by adjusting the exposure time further using the brightness distribution value.

FIG. 10E(a) shows an example of a real image 1031 having a lower average brightness level and a lower brightness distribution value than the real image 1030 shown in FIG. 10D(a). In particular, FIG. 10E(a) shows, by way of example, that the image 1031 has an average brightness level Lb1, which is greater than the first level L1, and a brightness distribution value Lv12, which is less than the second level L2.

Referring to FIG. 10E(a), the image 1031 include a first region 1033 and a second region 1014. In particular, the size of the first region 1033, which is a grey region, is greater by ΔA than a first region 1032 of the image 1030 shown in FIG. 10D(a).

In a case in which the average brightness level has high luminance and the brightness distribution value is relatively small, the processor 830 may control the exposure time of the image to be shorter.

That is, as shown in FIG. 10E(b), the processor 830 may set exposure time Te such that the exposure time Te is less than the exposure time Td in FIG. 10D(b).

As shown in FIG. 10E(c), therefore, an image 1041 acquired through adjustment of the exposure time may be vivid. In FIG. 10E(c), not only a first region 1033 of the image 1041 but also a second region 1018 of the image 1041 is vivid.

As can be seen from comparison between FIGS. 10E and 10D, the processor may set the exposure time Td such that the exposure time Td is greater than the exposure time Te in FIG. 10E(b) in a case in which the brightness distribution value is larger in a high luminance state.

The processor 830 may control the exposure time of the second image sensor 820b to be changed based on a brightness level and a brightness distribution value of an image acquired by the first image sensor 820a or an image acquired by the second image sensor 820b.

In a case in which a difference between a brightness level of an image photographed at a first point of time and a brightness level of an image photographed at a second point of time after the first point of time is equal to or greater than a predetermined level, on the other hand, the processor 830 may control the exposure time of an image sensed by the image sensor 820a after the second point of time to be gradually changed.

For example, in a case in which the brightness level of the image photographed at the first point of time is less than the brightness level of the image photographed at the second point of time, the processor 830 may control the exposure time to be gradually decreased.

In particular, the processor 830 may adjust the exposure time when the vehicle goes into a tunnel, when the vehicle is located in the tunnel, and when the vehicle comes out the tunnel, which will hereinafter be described with reference to FIGS. 11A to 12B.

Figure 11A:
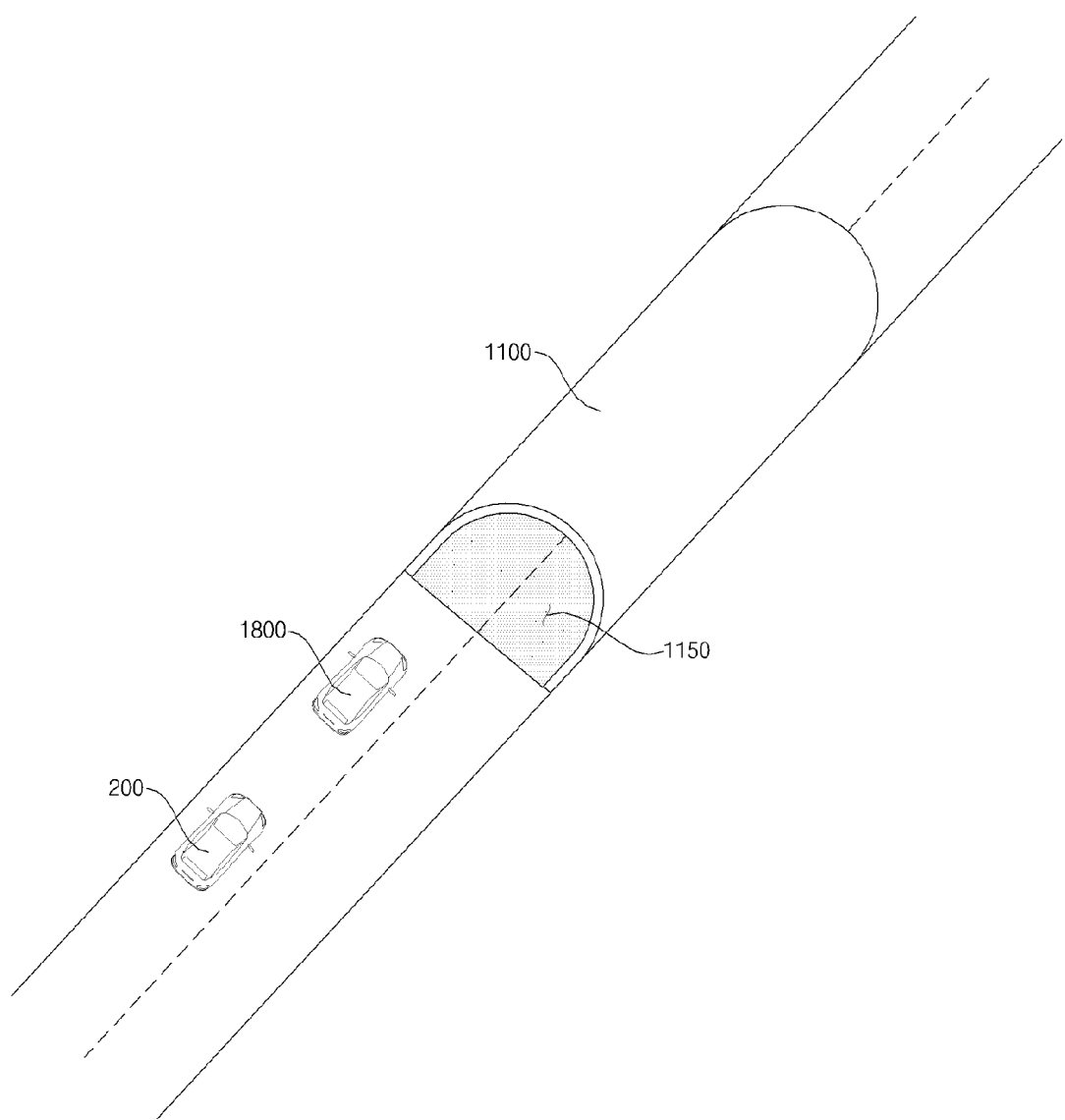

FIG. 11A shows, by way of example, that the vehicle 200 photographs an image containing a preceding vehicle 1800 before the vehicle goes from a bright location into a dark location, such as when travelling into a tunnel.

Figure 11B:
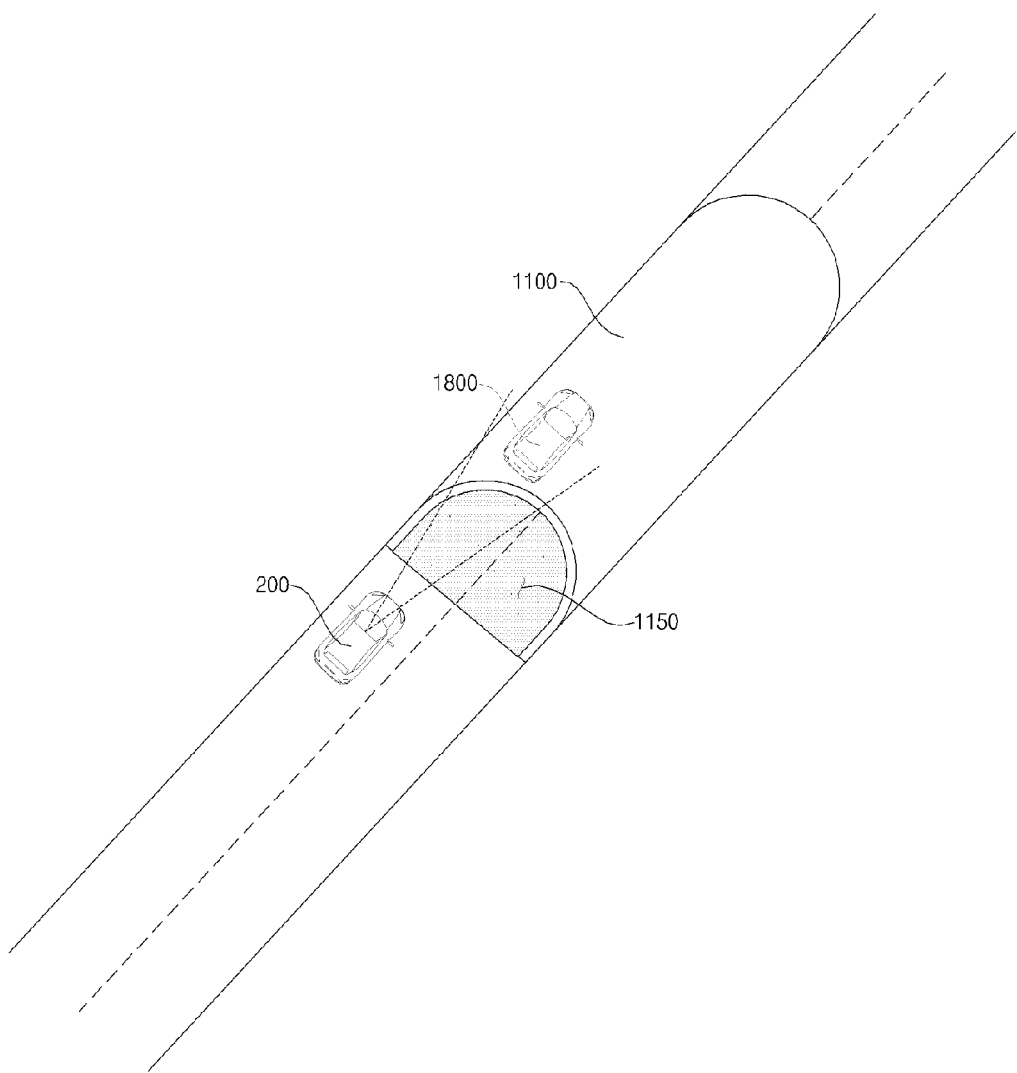

FIG. 11B shows, by way of example, that the vehicle 200 photographs an image containing the preceding vehicle 1800, which has gone into the tunnel, before the vehicle goes into the tunnel.

Figure 11C:
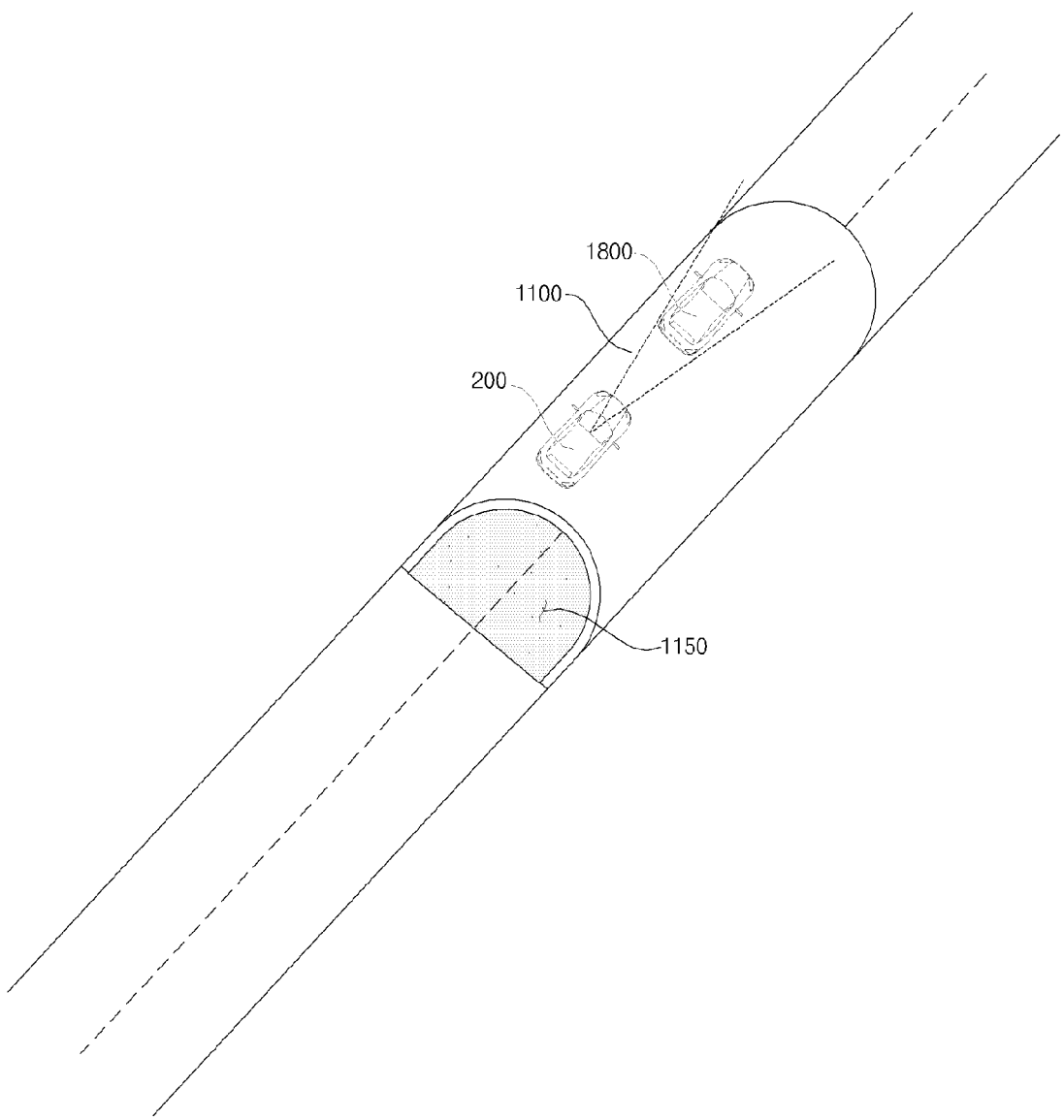

FIG. 11C shows, by way of example, that the vehicle 200 photographs an image containing the preceding vehicle 1800 in a state in which both the vehicle 200 and the preceding vehicle 1800 are located in the tunnel.

Figure 11D:
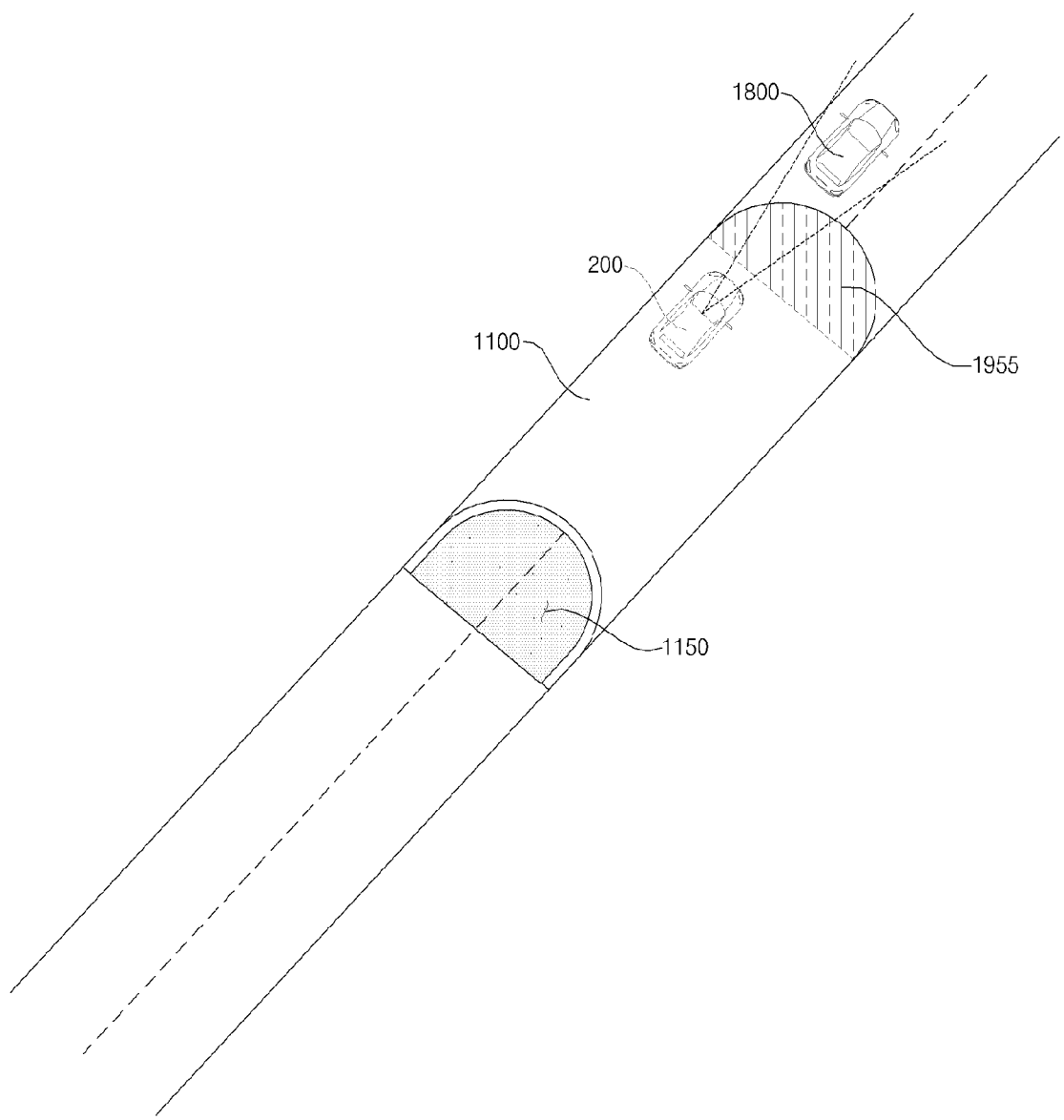

FIG. 11D shows, by way of example, that the vehicle 200 photographs an image containing the preceding vehicle 1800, which has come out of the tunnel, in a state in which the vehicle 200 is located in the tunnel.

Since both the vehicle 200 and the preceding vehicle 1800 are located outside the tunnel or in the tunnel in FIGS. 11A and 11C, the processor 830 may decide exposure time based on an average brightness level and a brightness distribution value of an image photographed by the camera.

During travel of the vehicle in the daytime, the processor 830 may set the exposure time of FIG. 11C to be longer. During travel of the vehicle at nighttime, on the other hand, the processor 830 may set the exposure time of FIG. 11A to be longer.

In a case in which the travel situation is gradually changed from the situation of FIG. 11A to the situation of FIG. 11B during travel of the vehicle in the daytime, the processor 830 may detect a brightness level of an image photographed at a first point of time and a brightness level of an image photographed at a second point of time after the first point of time and gradually change the exposure time of an image sensed by the image sensor 820*a* after the second point of time in a case in which the difference between the brightness level of the image photographed at the first point of time and the brightness level of the image photographed at the second point of time is equal to or greater than a predetermined level.

That is, the average brightness of the image containing the preceding vehicle 1800, which has gone into the tunnel, in FIG. 11B is considerably less than that of the image in FIG. 11A. Consequently, the processor 830 may control the exposure time to be increased as shown in FIG. 12A.

Figure 12A:
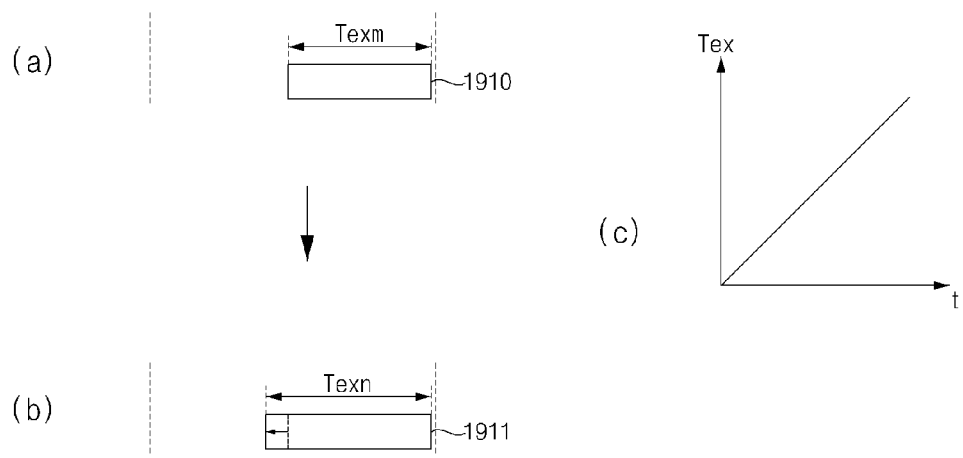

FIG. 12A(a) shows, by way of example, exposure time Texm corresponding to the case of FIG. 11A and an image 1910 based on the exposure time Texm. FIG. 12A(b) shows, by way of example, exposure time Texn corresponding to the case of FIG. 11B and an image 1911 based on the exposure time Texn. As shown in FIG. 12A(c), exposure time Tex may be gradually increased.

On the other hand, in a case in which the travel situation is gradually changed from the situation of FIG. 11C to the situation of FIG. 11D during travel of the vehicle in the daytime, the processor 830 may detect a brightness level of an image photographed at a first point of time and a brightness level of an image photographed at a second point of time after the first point of time and gradually change the exposure time of an image sensed by the image sensor 820*a* after the second point of time in a case in which the difference between the brightness level of the image photographed at the first point of time and the brightness level of the image photographed at the second point of time is equal to or greater than a predetermined level.

That is, the average brightness of the image containing the preceding vehicle 1800, which has come out of the tunnel, in FIG. 11D is considerably greater than that of the image in FIG. 11C. Consequently, the processor 830 may control the exposure time to be decreased as shown in FIG. 12B.

Figure 12B:
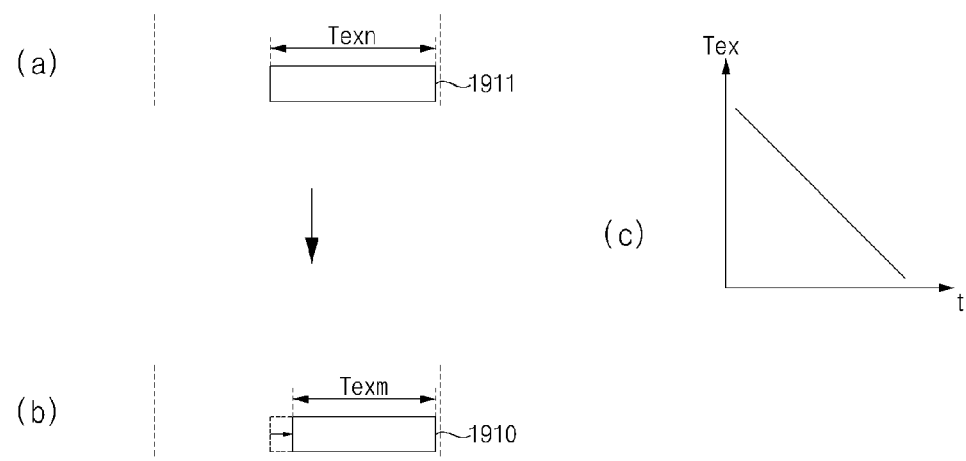

FIG. 12B(a) shows, by way of example, exposure time Texn corresponding to the case of FIG. 11C and an image 1911 based on the exposure time Texn. FIG. 12A(b) shows, by way of example, exposure time Texm corresponding to the case of FIG. 11D and an image 1910 based on the exposure time Texm. As shown in FIG. 12B(c), exposure time Tex may be gradually decreased.

In addition, in a case in which the travel situation is gradually changed from the situation of FIG. 11A to the situation of FIG. 11B during travel of the vehicle in the nighttime, the exposure time may be decreased as shown in FIG. 12B. On the other hand, in a case in which the travel situation is gradually changed from the situation of FIG. 11C to the situation of FIG. 11D during travel of the vehicle at nighttime, the exposure time may be increased.

Meanwhile, the cameras 195*a* and 195*b* equipped in the vehicle acquire images containing the preceding vehicle. The processor 830 or 170 detects and verifies an object based on the images containing the preceding vehicle.

During travel of the vehicle in the nighttime, the average brightness of an image photographed by the camera of the vehicle is instantaneously increased due to light from another vehicle on the opposite lane marker approaching the vehicle. Even in this case, it is possible for the processor 830 to decide the exposure time of the image sensor using an average brightness level and a brightness distribution value of the image and to detect a vivid image based on the decided exposure time according to the embodiment of the present disclosure.

Figure 13A:
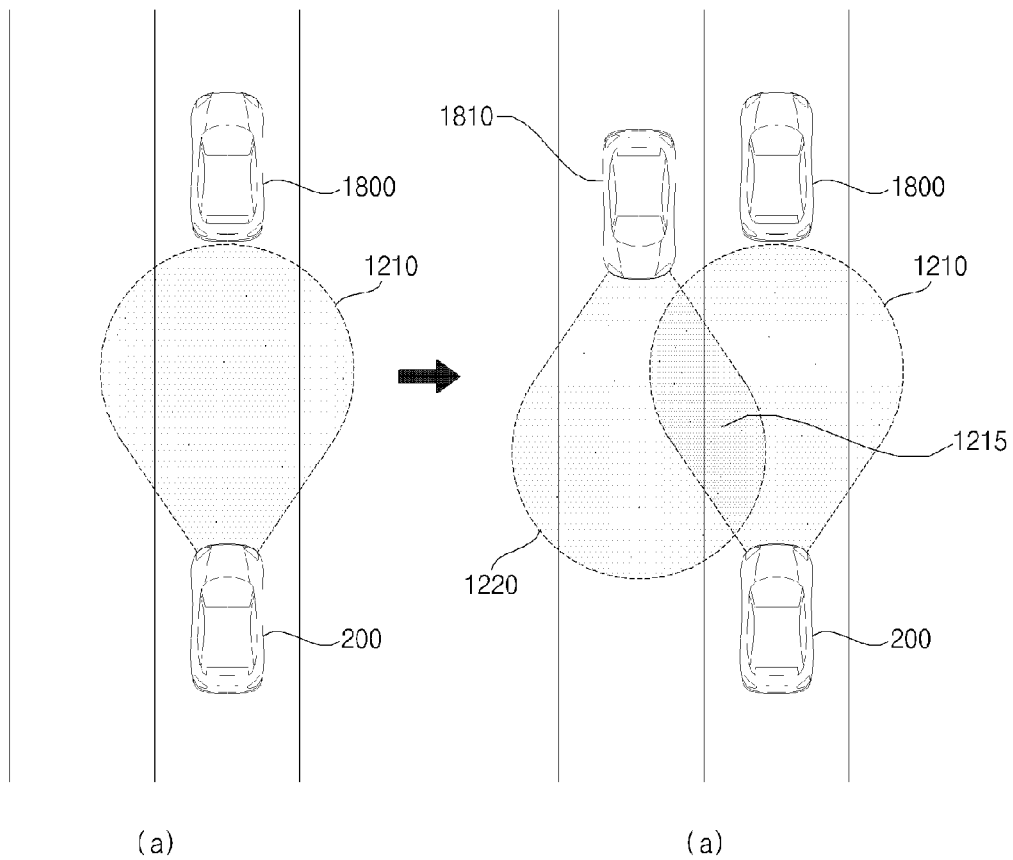

FIG. 13A(a) shows, by way of example, that a front lamp region 1210 formed by front lamps of the vehicle 200 reaches the rear of a preceding vehicle 1800 during travel of the vehicle 200 in the nighttime. The cameras 195*a* and 195*b* may acquire images containing the preceding vehicle 1800 with the front lamp region 1210.

On the other hand, FIG. 13A(a) shows, by way of example, that a front lamp region 1220 formed by front lamps of a vehicle 1810 on the opposite lane marker approaching the vehicle 200 is partially overlapped with the front lamp region 1210 formed by the front lamps of the vehicle 200 to constitute an overlapping region 12151.

Figure 13B:
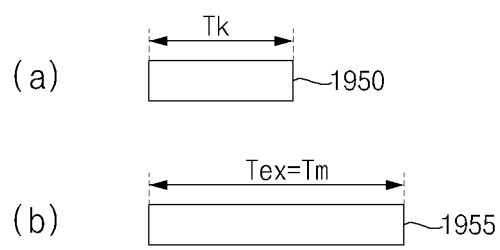

In this case, if exposure time Tk is decided in consideration of only a brightness component of an acquired image as shown in FIG. 13B(a), the preceding vehicle region may be blurred in an image 1950 corresponding to the exposure time Tk, which is short.

In order to solve the above problem, therefore, exposure time Tm may be set to be longer than the exposure time Tk in consideration of an average brightness level and distribution of the acquired image. As a result, the preceding vehicle region may be vivid in an image 1950 corresponding to the exposure time Tm and, therefore, it is possible to easily detect and verify an object for the preceding vehicle in the nighttime.

Meanwhile, the operation method of the camera and the vehicle according to the present disclosure may be implemented as code that can be written on a processor-readable recording medium and thus read by a processor provided in the camera or the vehicle. The processor-readable recording medium may be any type of recording device in which data is stored in a processor-readable manner. The processor-readable recording medium may include, for example, a read only memory (ROM), a random access memory (RAM), a compact disc read only memory (CD-ROM), a magnetic tape, a floppy disc, and an optical data storage device and may be implemented in the form of a carrier wave transmitted over the Internet. The processor-readable recording medium can be distributed over a plurality of computer systems connected to a network such that processor-readable code is written thereto and executed therefrom in a decentralized manner.

As is apparent from the above description, in a camera according to an embodiment of the present disclosure and a vehicle including the same, it is possible to change exposure time of an image sensed by an image sensor based on a brightness level and a brightness distribution value of the image photographed by the image sensor, thereby preventing the occurrence of motion blur in a low luminance environment.

In particular, it is possible to prevent the occurrence of motion blur due to excessive exposure time in the low luminance environment through application of the brightness distribution value.

Meanwhile, even in a case in which, during travel of the vehicle in the nighttime, brightness is instantaneously increased due to light from another vehicle on the opposite lane marker approaching the vehicle, it is possible to stably detect an object ahead of the vehicle at a long distance in consideration of the brightness distribution value.

On the other hand, it is possible to easily and rapidly detect an object based on the photographed image by changing the exposure time.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A camera device attached to a vehicle, the camera device comprising:
    a first image sensor to sense an image based on light acquired by a first camera; and
    a processor in communication with the first image sensor, wherein the processor modifies an exposure time of the image sensed by the first image sensor based on a brightness level and a brightness distribution value of the image acquired by the first image sensor, wherein when the vehicle goes into a tunnel, the processor controls the exposure time of the first image sensor to be gradually increased, wherein when the vehicle goes out of the tunnel, the processor controls the exposure time of the first image sensor to be gradually decreased, wherein, in a case in which the brightness distribution value is equal to or greater than a second level in a state in which the brightness level of the photographed image is equal to or less than a first level, the processor controls the exposure time to be shorter than in a case in which the brightness distribution value is less than the second level in a state in which the brightness level is equal to or less than the first level, and wherein the processor controls the exposure time to be shorter as the brightness level becomes higher in a state in which the brightness level is greater than the first level.

2. The camera device according to claim 1, wherein, in a case in which the brightness distribution value is equal to or greater than the second level in a state in which the brightness level is greater than the first level, the processor controls the exposure time to be longer than in a case in which the brightness distribution value is less than the second level in a state in which the brightness level is greater than the first level.

3. The camera device according to claim 1, wherein, in a case in which a difference between a brightness level of an image photographed at a first point of time and a brightness level of an image photographed at a second point of time after the first point of time is equal to or greater than a predetermined level, the processor controls the exposure time of an image sensed by the image sensor after the second point of time to be gradually changed.

4. The camera device according to claim 3, wherein, in a case in which the brightness level of the image photographed at the first point of time is greater than the brightness level of the image photographed at the second point of time, the processor controls the exposure time to be gradually increased.

5. The camera device according to claim 3, wherein, in a case in which the brightness level of the image photographed at the first point of time is less than the brightness level of the image photographed at the second point of time, the processor controls the exposure time to be gradually decreased.

6. The camera device according to claim 1, wherein the image sensor adjusts the exposure time based on an electric signal from the processor.

7. The camera device according to claim 1, further including:
    an aperture to adjust the amount of light incident upon the lens, wherein the processor controls an opening and closing time of the aperture to change the exposure time of the image sensed by the image sensor.

8. The camera device according to claim 1, further including:
    a second image sensor to sense a second image acquired by a second camera, wherein the second camera is spaced apart from the first camera, and wherein the processor modifies an exposure time of the second image sensed by the second image sensor, wherein the processor verifies an adjacent vehicle, a lane marker, a road surface, a traffic sign, or the tunnel around the vehicle based on the first image from the first image sensor and the second image from the second image sensor.

9. A vehicle comprising:
a steering apparatus;
a brake apparatus;

a power source;

a steering drive to drive the steering apparatus;

a brake drive to drive the brake apparatus;

a power source drive to drive the power source;

a controller that controls the steering drive, the brake drive, and the power source drive, wherein the controller generates a control signal to control at least one of the steering drive, the brake drive, or the power source drive in the vehicle, and a camera device equipped in the vehicle, wherein the camera device includes:

a first image sensor to sense an image based on light acquired by a first camera; and a processor in communication with the first image sensor, wherein the processor modifies an exposure time of the image sensed by the first image sensor based on a brightness level and a brightness distribution value of the image acquired by the first image sensor, wherein when the vehicle goes into a tunnel, the processor controls the exposure time of the first image sensor to be gradually increased, wherein when the vehicle goes out of the tunnel, the processor controls the exposure time of the first image sensor to be gradually decreased, and wherein, in a case in which the brightness distribution value is equal to or greater than a second level in a state in which the brightness level of the photographed image is equal to or less than the first level, the processor controls the exposure time to be shorter than in a case in which the brightness distribution value is less than the second level in a state in which the brightness level is equal to or less than the first level.

10. The vehicle according to claim 9, wherein the processor controls the exposure time to be shorter as the brightness level becomes higher in a state in which the brightness level is greater than the first level.

11. The vehicle according to claim 10, wherein, in a case in which the brightness distribution value is equal to or greater than the second level in a state in which the brightness level is greater than the first level, the processor controls the exposure time to be longer than in a case in which the brightness distribution value is less than the second level in a state in which the brightness level is greater than the first level.

12. The vehicle according to claim 9, wherein, in a case in which a difference between a brightness level of an image photographed at a first point of time and a brightness level of an image photographed at a second point of time after the first point of time is equal to or greater than a predetermined level, the processor controls the exposure time of an image sensed by the image sensor after the second point of time to be gradually changed.

13. The vehicle according to claim 12, wherein, in a case in which the brightness level of the image photographed at the first point of time is greater than the brightness level of the image photographed at the second point of time, the processor controls the exposure time to be gradually increased.

14. The vehicle according to claim 12, wherein, in a case in which the brightness level of the image photographed at the first point of time is less than the brightness level of the image photographed at the second point of time, the processor controls the exposure time to be gradually decreased.

15. The vehicle according to claim 9, wherein the camera further includes:

a second image sensor to sense a second image based acquired by a second camera, wherein the second camera is spaced apart from the first camera, and wherein the processor modifies an exposure time of the second image sensed by the second image sensor.

16. The vehicle according to claim 15, wherein the processor generates a disparity map and an RGB image based on stereo images from the first image sensor and the second image sensor, wherein the processor verifies an adjacent vehicle, a lane marker, a road surface, a traffic sign, or the tunnel around the vehicle based on the first image from the first image sensor and the second image from the second image sensor.

17. The vehicle according to claim 15, further including:

a second processor to generate a disparity map and an RGB image based on stereo images from the image sensor and the second image sensor, wherein the second processor or the controller generates a control signal to control at least one of the steering drive, the brake drive, and the power source drive in the vehicle based on the disparity map and the RGB image.

* * * * *